US012186735B2

(12) United States Patent
Awadh et al.

(10) Patent No.: US 12,186,735 B2
(45) Date of Patent: *Jan. 7, 2025

(54) BATCH METHOD FOR WASTEWATER TREATMENT

(71) Applicant: King Fahd University of Petroleum and Minerals, Dhahran (SA)

(72) Inventors: Tawfik Abdo Saleh Awadh, Dhahran (SA); Akram Abdulhakeem Al-Absi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/808,269

(22) Filed: Aug. 19, 2024

(65) Prior Publication Data

US 2024/0408576 A1    Dec. 12, 2024

Related U.S. Application Data

(60) Continuation of application No. 17/745,929, filed on May 17, 2022, now Pat. No. 12,102,978, which is a division of application No. 16/519,692, filed on Jul. 23, 2019, now Pat. No. 11,583,828.

(51) Int. Cl.

| B01J 20/28 | (2006.01) |
|---|---|
| B01J 20/06 | (2006.01) |
| B01J 20/20 | (2006.01) |
| B01J 20/26 | (2006.01) |
| B01J 20/30 | (2006.01) |
| C02F 1/28 | (2023.01) |
| C08G 83/00 | (2006.01) |
| C01B 32/354 | (2017.01) |
| C02F 101/22 | (2006.01) |
| C02F 101/30 | (2006.01) |

(52) U.S. Cl.
CPC ......... *B01J 20/28009* (2013.01); *B01J 20/06* (2013.01); *B01J 20/20* (2013.01); *B01J 20/262* (2013.01); *B01J 20/28061* (2013.01); *B01J 20/28071* (2013.01); *B01J 20/28083* (2013.01); *B01J 20/3085* (2013.01); *C02F 1/288* (2013.01); *C08G 83/001* (2013.01); *B01J 2220/46* (2013.01); *B01J 2220/4806* (2013.01); *C01B 32/354* (2017.08); *C02F 2101/22* (2013.01); *C02F 2101/308* (2013.01)

(58) Field of Classification Search
CPC ...... B01J 20/28009; B01J 20/06; B01J 20/20; B01J 20/262; B01J 20/28061; B01J 20/28071; B01J 20/28083; B01J 20/3085; B01J 2220/46; B01J 2220/4806; C02F 1/288; C02F 2101/22; C02F 2101/308; C08G 83/001; C01B 32/354

USPC .......................................................... 502/402
See application file for complete search history.

(56) References Cited

U.S. PATENT DOCUMENTS

| 9,687,813 B2 | 6/2017 | Saleh | |
|---|---|---|---|
| 11,583,828 B2 | 2/2023 | Awadh | |
| 2022/0280917 A1* | 9/2022 | Awadh | ............... B01J 20/28071 |

FOREIGN PATENT DOCUMENTS

| CN | 102188957 A | 9/2011 |
|---|---|---|
| CN | 108620048 A | 10/2018 |
| WO | 00/64578 | 2/2000 |
| WO | 2015/044964 A1 | 4/2015 |

OTHER PUBLICATIONS

Saleh, et al. ; Polyethylenimine modified activated carbon as novel magnetic adsorbent for the removal of uranium from aqueous solution ; Chemical Engineering Research and Design, vol. 117 ; pp. 218-227 ; Jan. 2017 ; Abstract Only ; 2 Pages.

Eid ; Polyethylenimine-functionalized magnetic amorphous carbon fabricated from oil palm leaves as a novel adsorbent for Hg(II) from aqueous solutions ; Egyptian Journal of Petroleum, vol. 27, Issue 4 ; pp. 1051-1060 ; Dec. 2018 ; 20 Pages.

Lakshmanan ; Application of magnetic Nanoparticles and Reactive Filter Materials for Wastewater Treatment ; Doctoral Thesis ; Royal Institute of technology. School of Biotechnology, Stockholm ; Dec. 2013 ; 73 Pages.

Chen, et al. ; Highly stable and covalently functionalized magnetic nanoparticles by polyethyleneimine for Cr(VI) adsorption in aqueous solution ; RSC Advances, Issue 2 ; 2015 ; Abstract Only ; 4 Pages.

Eid ; Synthesis of Polyethylenimine-magnetic amorphous carbon nano composite as a novel adsorbent for Hg (II) from aqueous solutions ; Australian Journal of Basic and Applied Sciences, 10(18) ; pp. 323-335 ; Dec. 2016 ; 13 Pages.

Hristovski, et al. ; Selecting metal oxide nanomaterials for arsenic removal in fixed bed columns: From nanopowders to aggregated nanoparticle media ; Journal of Hazardous Materials, vol. 147, Issue 1-2 ; pp. 265-274 ; Aug. 17, 2007 ; 2 Pages.

\* cited by examiner

*Primary Examiner* — Edward M Johnson
(74) *Attorney, Agent, or Firm* — Oblon, McClelland, Maier & Neustadt, L.L.P.

(57) ABSTRACT

A polymer/activated carbon composite made up of a branched polyethylenimine and magnetic cores involving $Fe_3O_4$ disposed activated carbon. The magnetic cores have activated carbonyl groups on the surface. A process for removing organic dyes, such as methyl red, as well as heavy metal ions from a polluted aqueous solution or an industrial wastewater utilizing the composite is introduced. A method of synthesizing the polymer/activated carbon composites is also specified.

11 Claims, 10 Drawing Sheets

BATCH METHOD FOR WASTEWATER TREATMENT

CROSS-REFERENCE TO RELATED APPLICATIONS

The present application is a Continuation of U.S. application Ser. No. 17/745,929, now allowed, having a filing date of May 17, 2022 which is a Division of U.S. application Ser. No. 16/519,692, now U.S. Pat. No. 11,583,828, having a filing date of Jul. 23, 2019.

BACKGROUND OF THE INVENTION

Technical Field

The present disclosure relates to a composite material for wastewater treatment. More specifically, the present disclosure relates to a magnetic composite formed from a reaction of $Fe_3O_4$ disposed on activated carbon having activated carbonyl groups and branched polyethylenimine. Additionally, the present disclosure relates to applications of the composite as an adsorbent for removal of organic dyes and heavy metals from wastewater and other contaminated aqueous media.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

More than 100,000 different kinds of dyes are commercially available [H. Zollinger. VCH, Publishers, New York, 1987, pp. 92-100] and approximately 750,000 tons of dyes [Hunge, C. WILEY-VCH. 31 Mar. 2004] are produced annually. Dyes are used in the production of plastic, paint, paper, leather, and many other industries. As such, large quantities of dye-containing waste effluent are discharged into the environment. Recent studies estimated that more than 12% of dyes used in textile industry are disposed as byproduct and approximately 20% of this residual dye waste is ultimately released into the environment via wastewater [M. Hema, S. Arivoli. Int. J. Phys. Sci. 2 (2007) 10-17].

It is difficult to remove residual dyes from textile production wastewater through conventional wastewater treatment plants [W. Delee, C. ONeil, F. R. Hawkes, et al. J Chem Technol Biotechnol, 73 (1998), pp. 323-335]. Several ways to remove dyes have been reported such as adsorption, photocatalytic degradation, coagulation, ozone treatment, hypochlorite treatment, liquid-liquid extraction, and contact with electro Fenton's reagent [Muthuraman, G., & Teng, Tjoon Tow. Progress in Natural Science. 2009]. Among all of these processes, adsorption is the most widely used because it is efficient and viable for large scale dye removal. Despite recent advances there is still a need to develop more effective adsorbents for dye removal.

In view of the forgoing, one objective of the present disclosure is to provide an adsorbent composite formed from a reaction of a magnetic core having $Fe_3O_4$ disposed on activated carbon having activated carbonyl groups and a branched polyethylenimine. A further objective of the present disclosure is to provide a method of preparing the composite described herein as well as a method for removing organic dyes, such as methyl red, and heavy metals from aqueous solutions by employing the adsorbing capabilities of the composite.

BRIEF SUMMARY OF THE INVENTION

According to a first aspect, the present disclosure relates to a composite, which is a product formed by a reaction of a magnetic core involving $Fe_3O_4$ disposed on activated carbon, and a branched polyethylenimine, wherein the $Fe_3O_4$ is in the form of nanoparticles having an average particle size of 1-100 nm, and the magnetic core comprises activated carbonyl groups on a surface of the magnetic core.

In one embodiment, the activated carbonyl group is an acyl halide group.

In one embodiment, the branched polyethylenimine is bonded to the surface of the magnetic core via an amide linkage.

In one embodiment, the branched polyethylenimine has a weight average molecular weight in a range of 200-50,000.

In one embodiment, a weight ratio of the $Fe_3O_4$ nanoparticles to the activated carbon is in a range of 2:3 to 3:1.

In one embodiment, the composite has a surface area of 140-180 $m^2/g$.

In one embodiment, the composite has a pore volume of 0.2-0.28 $cm^3/g$, and a pore size of 4-8 nm.

According to a second aspect, the present disclosure relates to a method of preparing the composite of the first aspect, wherein the activated carbonyl group is an acyl halide group. The method involves the steps of (i) treating an activated carbon with an acid to form a carboxylated carbon, (ii) mixing the carboxylated carbon, a Fe(II) salt, a Fe(III) salt, and a base in the presence of a solvent to form a mixture, (iii) heating the mixture to form a magnetic carbon, (iv) mixing the magnetic carbon and a halide reagent to form a magnetic core, and (v) reacting the magnetic core with the branched PEI, thereby forming the composite, wherein the halide reagent is at least one selected from the group consisting of a thionyl halide, an oxalyl halide, phosphorus trihalide, and phosphorous pentahalide.

In a further embodiment, the activated carbon is formed by granulating and pyrolyzing waste tires.

In one embodiment, the Fe(II) salt is $FeSO_4$, and the Fe(III) salt is $FeCl_3$.

In one embodiment, the acid is nitric acid, and the base is sodium hydroxide, ammonia, or both.

In one embodiment, the mixture has a pH in a range of 8-14.

In one embodiment, the heating is performed at a temperature of 70-150° C. for 2-12 hours.

In one embodiment, the reacting is performed at a temperature of 30-100° C. for 4-24 hours.

According to a third aspect, the present disclosure relates to a method for removing a pollutant from an aqueous solution. The method involves contacting the aqueous solution having an initial concentration of the pollutant with the composite of the first aspect to form a mixture, and filtering the mixture to obtain a pollutant loaded composite and an aqueous solution having a reduced concentration of the pollutant compared to the initial concentration.

In one embodiment, the pollutant is an organic dye, a heavy metal, or both.

In one embodiment, the pollutant is an organic dye, and the organic dye is methyl red.

In one embodiment, the pollutant is a heavy metal, and the heavy metal is an ion of at least one heavy metal selected from the group consisting of Cd, Pb, Cu, Cr, Ni, and As.

In one embodiment, the composite is present in a concentration in a range of 0.01-20 g per liter of the aqueous solution during the contacting, and greater than 70% of a total mass of the pollutant is removed from the aqueous solution.

According to a fourth aspect, the present disclosure relates to a filtration system including a tube with an inlet and an outlet, and the composite of the first aspect disposed inside an internal cavity of the tube.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
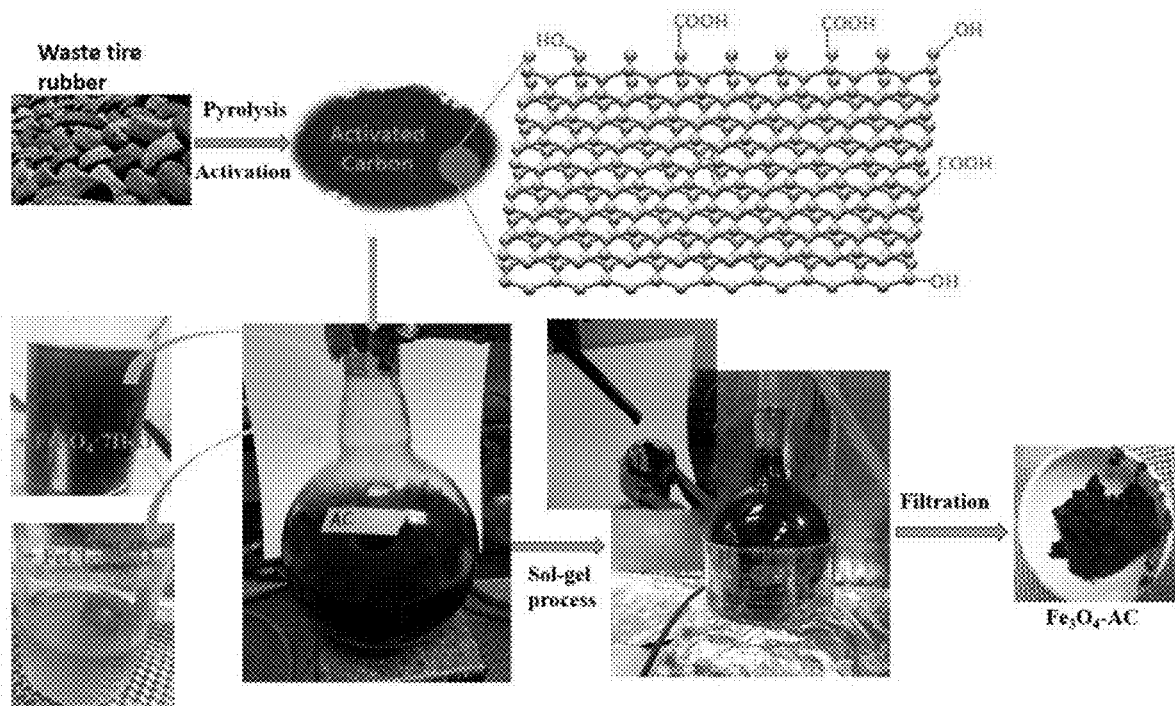
FIG. 1A is a schematic illustration showing the preparation of magnetic carbon.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the individual components.

The term "microporous" refers to a surface having an average pore diameter of less than 2 nm, while the term "mesoporous" refers to a surface having an average pore diameter of 2-50 nm.

The present disclosure includes all hydration states of a given salt or formula, unless otherwise noted. For example, $FeSO_4$ includes anhydrous $FeSO_4$, heptahydrate $FeSO_4 \cdot 7H_2O$, and any other hydrated forms or mixtures.

According to a first aspect, the present disclosure relates to a composite, which is a product formed by a reaction of a magnetic core involving $Fe_3O_4$ disposed on activated carbon, and a branched polyethylenimine.

A particle is defined as a small object that behaves as a whole unit with respect to its transport and properties. An average diameter (e.g., average particle size) of the particle, as used herein, and unless otherwise specifically noted, refers to the average linear distance measured from one point on the particle through the center of the particle to a point directly across from it. For a circle, an oval, an ellipse, and a multilobe, the term "diameter" refers to the greatest possible distance measured from one point on the shape through the center of the shape to a point directly across from it. For polygonal shapes, the term "diameter", as used herein, and unless otherwise specified, refers to the greatest possible distance measured from a vertex of a polygon through the center of the face to the vertex on the opposite side.

Nanoparticles are particles between 1 and 100 nm in size. The exceptionally high surface area to volume ratio of nanoparticles may cause the nanoparticles to exhibit significantly different or even novel properties from those observed in individual atoms/molecules, fine particles and/or bulk materials. Nanoparticles may be classified according to their dimensions. Three-dimensional nanoparticles preferably have all dimensions of less than 100 nm, and generally encompass isodimensional nanoparticles. Examples of three dimensional nanoparticles include, but are not limited to nanospheres, nanogranules and nanobeads. Two-dimensional nanoparticles have two dimensions of less than 100 nm, generally including diameter. Examples of two-dimensional nanoparticles include, but are not limited to, nanosheets, nanoplatelets, nanolaminas and nanoshells. One-dimensional nanoparticles have one dimension of less than 100 nm, generally thickness. Examples of one-dimensional nanoparticles include, but are not limited to, nanorods, nanotubes, nanofibers and nanowhiskers.

Iron (III) oxide or ferric oxide is the inorganic compound with formula $Fe_2O_3$. It is one of the three main oxides of iron, the other two being iron (II) oxide (FeO) which is rare, and iron (II,III) oxide ($Fe_3O_4$) which also occurs naturally as the mineral magnetite. $Fe_2O_3$ is ferromagnetic, dark red and readily attacked by acids. $Fe_2O_3$ can be obtained in various polymorphs. In the major polymorphs, α and γ, iron adopts an octahedral coordination geometry, each Fe center is bound to six oxygen ligands. α-$Fe_2O_3$ has the rhombohedral corundum structure and is the most common form. It occurs naturally as the mineral hematite which is mined as the main ore of iron. γ-$Fe_2O_3$ has a cubic structure, is metastable and converts to the alpha phase at high temperatures. It is also ferromagnetic. Several other phases have been identified, including the β-phase, which is cubic body centered, metastable, and converts to the alpha phase at temperatures above 500° C., and the epsilon phase, which is rhombic, and shows properties intermediate between alpha and gamma phases. This phase is also metastable, transforming to the alpha phase between 50° and 750° C. Additionally, at high pressure an iron oxide can exist in an amorphous form.

Iron (II, III) oxide or magnetite is another main oxide of iron with formula $Fe_3O_4$. It contains both $Fe^{2+}$ and $Fe^{3+}$ ions and is sometimes formulated as $FeO \cdot Fe_2O_3$. It exhibits permanent magnetism and is ferrimagnetic, although sometimes described as ferromagnetic. Its particle size and shape can be varied by the method of production. $Fe_3O_4$ has a cubic inverse spinel structure which consists of a cubic close packed array of oxide ions where all of the $Fe^{2+}$ ions occupy half of the octahedral sites and the $Fe^{3+}$ are split evenly across the remaining octahedral sites and the tetrahedral sites. Both FeO and γ-$Fe_2O_3$ have a similar cubic close packed array of oxide ions and this accounts for the interchangeability between the three compounds on oxidation and reduction as these reactions entail a relatively small change to the overall structure. $Fe_3O_4$ samples can be non-stoichiometric. In a preferred embodiment, the composite of the present disclosure contains iron oxides which are substantially $Fe_3O_4$. In some embodiments, other iron oxides including iron (III) oxide having an a polymorph, a β polymorph, a γ polymorph, an ε polymorph or mixtures thereof may be present in the composite in addition to or in lieu of $Fe_3O_4$.

Due to its four unpaired electrons in the 3d shell, an iron atom has a strong magnetic moment. $Fe^{2+}$ ions also have four unpaired electrons in the 3d shell and $Fe^{3+}$ ions have five unpaired electrons in the 3d shell. Thus, when crystals are formed from iron atoms or $Fe^{2+}$ and $Fe^{3+}$ ions they can be ferromagnetic, antiferromagnetic or ferrimagnetic states. The ferrimagnetism of $Fe_3O_4$ arises because the electron spins of the $Fe^{II}$ and $Fe^{III}$ ions in the octahedral sites are coupled and the spins of the $Fe^{III}$ ions in the tetrahedral sites are coupled but anti-parallel to the former. The net effect is that the magnetic contributions of both sets are not balanced and there is permanent magnetism.

In the paramagnetic state, the individual atomic magnetic moments are randomly oriented, and the substance has a zero net magnetic moment if there is no magnetic field. These materials have a relative magnetic permeability greater than one and are attracted to magnetic fields. The magnetic moment drops to zero when the applied field is removed. However, in a ferromagnetic material, all the atomic moments are aligned even without an external field. A ferrimagnetic material is similar to a ferromagnet but has two different types of atoms with opposing magnetic moments. The material has a magnetic moment because the opposing moments have different strengths. If they have the same magnitude, the crystal is antiferromagnetic and possesses no net magnetic moment. Superparamagnetism is a form of magnetism, which appears in small ferrimagnetic or ferromagnetic nanoparticles. In sufficiently small nanoparticles, magnetization can randomly flip direction under the influence of temperature.

In a preferred embodiment, the iron oxide present in the composite is superparamagnetic, paramagnetic, ferromagnetic, antiferromagnetic and/or ferrimagnetic, more preferably the iron oxide in the composite possesses permanent magnetism and comprises magnetite ($Fe_3O_4$) and/or its oxidized form maghemite (γ-$Fe_2O_3$), most preferably the iron oxide in the composite possess permanent magnetism and is $Fe_3O_4$ (magnetite).

Preferably, the composite described herein has nanostructured $Fe_3O_4$. The nanostructured $Fe_3O_4$ may be present in the form of particles of the same shape or different shapes, and of the same size or different sizes. In one or more embodiments, the nanostructured $Fe_3O_4$ is in the form of nanoparticles. The $Fe_3O_4$ nanoparticles may be one-dimensional, two-dimensional, three-dimensional or mixtures thereof. The $Fe_3O_4$ nanoparticles in the present disclosure may have one or two dimensions greater than 100 nm. In some embodiments, the $Fe_3O_4$ nanoparticles are in the form of at least one shape such as a sphere, a rod, a cylinder, a rectangle, a triangle, a pentagon, a hexagon, a prism, a disk, a platelet, a flake, a cube, a cuboid, and an urchin (e.g., a globular particle possessing a spiky uneven surface). In one embodiment, the composite contains $Fe_3O_4$ nanoparticles with an average particle size of 1-100 nm, preferably 2-80 nm, preferably 5-60 nm, preferably 10-50 nm, preferably 15-40 nm, preferably 18-30 nm, preferably 20-25 nm.

The magnetic core contains $Fe_3O_4$, preferably a plurality of $Fe_3O_4$ nanoparticles, disposed on activated carbon. The activated carbon may be in particulate form as powdered activated carbon, granular activated carbon, extruded activated carbon, bead activated carbon, but is not limited to such forms of activated carbon. In at least one embodiment, the activated carbon used herein is in the form of powdered activated carbon. In one or more embodiments, the activated carbon is in the form of spherical particles, or substantially spherical (e.g., oval or oblong shape) particles. In at least one embodiment, the activated carbon particles are devoid of two-dimensional sheet shaped structures, which are found in activated carbon fabricated from oil palm leaves.

Materials such as activated carbon [M. Ghaedi, A. Shokrollahi, H. Tavallali, F. Shojaiepoor, B. Keshavarz, H. Hossainian, M. Soylak, M. K. Purkait. Toxicological & Environmental Chemistry 93, 3, 2011], bagasse pith, modified zeolites [Z. Ioannou, C. Karasavvidis, A. Dimirkou, V., Water Sci. Technol. 67 (2013) 1129-1136], clay minerals, peat [G. McKay, S. J. Allen, J. Separ. Proc. Technol. 4 (3) (1983) 1], and wood were tested for their adsorption capabilities. Among these adsorbents, activated carbon was found to be superior due to its porous morphology, high surface area, high adsorption efficiency, and large adsorption capacity [M. Ghaedi, A. Shokrollahi, H. Tavallali, F. Shojaiepoor, B. Keshavarz, H. Hossainian, M. Soylak, M. K. Purkait. Toxicological & Environmental Chemistry 93, 3, 2011]. However, commercially available activated carbon is expensive [Malik, P. K. Journal of Hazardous Materials B113 (2004) 81-88]. Therefore, a low-cost preparation of activated carbon from resources such as agricultural materials, waste rubber tires, and plastics etc. may be a potential alternative to obtain cheap activated carbon adsorbents. For example, pyrolytic tire char was used to develop activated carbon for the removal of pollutants such as phenols [Tanthapanichakoon W, Ariyadejwanich P, Japthong P, Nakagawa K, Mukai S R, Tamon H, 2005. Water Research, 39 (7): 1347-1353, incorporated herein by reference in its entirety], heavy metal ions [Adsorption of lead ions from aqueous solution using porous carbon derived from rubber tires: Experimental and computational study, Journal of colloid and interface science, 396, 264-269, incorporated herein by reference in its entirety], pesticides [Removal of Phenol from Water by Adsorption Using Zeolites, Ind. Eng. Chem. Res. 2004, 4317, 5275-5280, incorporated herein by reference in its entirety], and dyes [Garcia I T S, Nunes M R, Carreo N L V, Wallaw W M, Fajardo H V, Probst L F D, 2007. Polímeros, 17:329-333; and Saleh T A, AA Al-Saadi2015, Surface and Interface Analysis, 47 (7), 785-792, each incorporated herein by reference in their entirety].

In general, modifications of activated carbon fall into three categories: chemical (acidic treatment, basic treatment, and impregnation of foreign materials), physical (heat treatment), and biological modification (desorption) [Chun Yang Yin, Mohd Kheireddine Aroua, Wan Mohd Ashri Wan Daud, Separation and Purification Technology, Volume 52, Issue 3, January 2007, Pages 403-415, ISSN 1383-5866]. Studies reported that the uptake of the contaminant by modified activated carbon might increase by a factor of 2 or greater [Chun Yang Yin, Mohd Kheireddine Aroua, Wan Mohd Ashri Wan Daud, Separation and Purification Technology, Volume 52, Issue 3, January 2007, Pages 403-415, ISSN 1383-5866]. Activated carbon may be modified by metal or metal oxide nanomaterials. For example, magnetic activated carbons (MACs) with a large surface area were used for the removal of several environmental pollutants [André L. Cazetta, Osvaldo Pezoti, Karen C. Bedin, Taís L. Silva, Andrea Paesano Junior, Tewodros Asefa, and Vitor C. Almeida. ACS Sustainable Chemistry & Engineering 2016 4 (3), 1058-1068, incorporated herein by reference in its entirety]. In addition, due to its magnetic properties, MACs can be conveniently separated after adsorption process simply using a magnetic bar.

$Fe_3O_4$, preferably a plurality of $Fe_3O_4$ nanoparticles, may be disposed on the activated carbon. As used herein, "disposed on" describes being completely or partially filled throughout, saturated, permeated, and/or infused. The $Fe_3O_4$ may be affixed on one or more surfaces of the activated carbon. For example, the $Fe_3O_4$ may be affixed on an outer surface of the activated carbon and/or within pore spaces of the activated carbon. The $Fe_3O_4$ may be affixed to the activated carbon in any reasonable manner, such as physisorption, chemisorption, or combinations thereof. In one embodiment, up to 10% of the surface area (i.e. outer surface and pore spaces) of the activated carbon is covered by $Fe_3O_4$. Preferably up to 15%, preferably up to 20%, preferably up to 25%, preferably up to 30%, preferably up to 35%, preferably up to 40%, preferably up to 45%, preferably up to 50%, preferably up to 55%, preferably up to 60%, preferably up to 65%, preferably up to 70%, or preferably up to 75% of the surface area of the activated carbon is covered by $Fe_3O_4$.

In a preferred embodiment, a weight ratio of the $Fe_3O_4$ (e.g. $Fe_3O_4$ nanoparticles) to the activated carbon is in a range of 1:2 to 4:1, preferably 2:3 to 3:1, more preferably 1:1 to 2:1.

In one or more embodiments, the composite described herein is derived from a polymeric network which is reinforced with the magnetic core through covalent functionalization. As used herein, covalent functionalization is based on the formation of covalent linkages between organic entities and the surface of the magnetic core. It could also be divided into direct covalent functionalization and indirect covalent functionalization with carboxylic groups on a surface of magnetic cores. These carboxylic groups might have existed on the as-prepared activated carbon and $Fe_3O_4$, and may be further generated through oxidative reactions. Alternatively, direct covalent functionalization of activated carbon may be associated with a change in hybridization from $sp^2$ to $sp^3$ and a simultaneous loss of conjugation. In some embodiments, the carboxylic groups exist on a surface of the activated carbon and a surface of $Fe_3O_4$.

In terms of the present disclosure, the covalent functionalization takes advantage of chemical conversion of carboxylic groups to activated carbonyl groups on the surface of the magnetic core (e.g. activated carbon, $Fe_3O_4$) in order to increase their reactivity. Accordingly, the magnetic core comprises activated carbonyl groups on a surface of the magnetic core. The activated carbonyl groups may be present on the surface of the activated carbon, on the surface of $Fe_3O_4$, or both. Exemplary activated carbonyl groups include, but are not limited to, acyl halides, carboxylic anhydrides, and lactone. In a preferred embodiment, the activated carbonyl group is an acyl halide group, for example, an acyl chloride or acyl bromide group. Other carbonyl groups (e.g., carboxylic acids, esters, aldehydic, ketonic groups) may also be suitable to functionalize magnetic cores intended for the reaction to generate the composite, although such groups may require in situ activation by amide coupling agents/catalysts such as peptide coupling agents (e.g., BOP reagent, benzotriazol-1-yl-oxytripyrrolidinophosphonium hexafluorophosphate, N,N'-diisopropylcarbodiimide, 4-(4,6-dimethoxy-1,3,5-triazin-2-yl)-4-methylmorpholinium chloride, 3-(diethoxyphosphoryloxy)-1,2,3-benzotriazin-4 (3H)-one, 1-[Bis(dimethylamino)methylene]-1H-1,2,3-triazolo[4,5-b]pyridinium 3-oxid hexafluorophosphate, 2-(1H-benzotriazol-1-yl)-1,1,3,3-tetramethyluronium hexafluorophosphate, 7-Azabenzotriazol-1-yloxy)tripyrrolidinophosphonium hexafluorophosphate). Alternatively, the magnetic cores of the present disclosure may be surface modified with hydroxy and/or amine functionalities.

An adsorbent may be further modified with amines to increase the adsorption capacity. Amine-modified adsorbent is considered as one of the most efficient adsorbents in removing anions from solutions. However, amine-modified adsorbents had a series of problems, including difficulty in separating adsorbent and adsorbate from the solution [Wen Song, Baoyu Gao, Xing Xu, Lulu Xing, Shuang Han, Pijun Duan, Wuchang Song, Ruibao Jia, Bioresource Technology, 29 Jan. 2016, ISSN 0960-8524, incorporated herein by reference in its entirety]. Wen et al. added amine modified $Fe_3O_4$ to cellulose and tested its removal of Methyl Orange (MO), Reactive Brilliant Red K-2BP (RBR), and Acid Red 18 (AR).

Monomers are molecules which can undergo polymerization, thereby contributing constitutional repeating units to the structures of a macromolecule or polymer. The process by which monomers combine end to end to form a polymer is referred to herein as "polymerization" or "polycondensation". As used herein, a "copolymer" refers to a polymer derived from more than one species of monomer and are obtained by "copolymerization" of more than one species of monomer.

Polyethylenimine (PEI, polyaziridine) is a polyamine with repeating units having an amine group and an aliphatic ethylene (—$CH_2CH_2$—) spacer. The PEIs of the present disclosure include unsubstituted PEIs, salts thereof, and derivatives thereof such as ethoxylated PEIs. Linear unsubstituted PEIs contain predominantly secondary amines (with primary amine end groups), in contrast to branched PEIs which contain a mixture of primary, secondary, and tertiary amino groups. Branched PEIs may be made in house via acid-catalyzed ring opening polymerization of aziridine (ethyleneimine). Branched PEIs are also available from commercial vendors such as Sigma Aldrich, Alfa Aesar, TCI America, and Acros Organics.

The PEI of the present disclosure is a branched PEI, a salt thereof, a derivative thereof, or a mixture thereof. In at least one embodiment, the PEI of the present disclosure is devoid of linear PEIs. In some embodiments, the branched PEI of the present disclosure has a mixture of primary, secondary, and tertiary amine substituents, in a ratio of primary to secondary amine substituents ranging from 1:0.7 to 1:2, 1:0.8 to 1:1.5, 1:0.9 to 1:1.2, or 1:1 to 1:1.1, and a ratio of secondary to tertiary amine substituents ranging from 0.7:1 to 2:1, 0.8:1 to 1.8:1, 0.9:1 to 1.5:1, or 1:1 to 1.2:1. Alternatively, the branched PEI of the present disclosure is in a fully branched, dendrimer form. The PEI dendrimer may not contain secondary amino groups. In one embodiment, the branched PEI is a modified PEI which is a copolymer of branched PEIs and one or more compatible polymers. Exemplary copolymers of branched PEI include branched polyethylenimine-graft-poly(ethylene glycol), and copolymers of branched polyethylenimine and polyacrylamide.

In one or more embodiments, the branched polyethylenimine has a number average molecular weight in a range of 200-80,000 Da, 400-60,000 Da, 600-40,000 Da, 800-20,000 Da, 1,000-10,000 Da, 2,000-8,000 Da, 3,000-6,000 Da, or 4,000-5,000 Da.

In one embodiment, a weight percentage of the branched polyethylenimine relative to a total weight of the composite is 15 wt % to 50 wt %, preferably 20 wt % to 45 wt %, preferably 25 wt % to 40 wt %, preferably 30 wt % to 35 wt %.

The composite comprises a product formed by a reaction of the magnetic core and a branched polyethylenimine. In most embodiments, the branched polyethylenimine includes secondary amino (—NH—) and/or primary amino (—$NH_2$) groups that readily form covalent linkages, preferably amide bonds, with activated carbonyl groups (e.g. acyl halide) on the surface of the magnetic core (e.g. a surface of the activated carbon, a surface of $Fe_3O_4$). Accordingly, the branched polyethylenimine is preferably bonded to the surface of the magnetic core via one or more amide linkages.

In one embodiment, up to 10% of the surface area of the magnetic core is covered by the branched polyethylenimine. Preferably up to 15%, preferably up to 20%, preferably up to 25%, preferably up to 30%, preferably up to 35%, preferably up to 40%, preferably up to 45%, preferably up to 50%, preferably up to 55%, preferably up to 60%, preferably up to 65%, preferably up to 70%, preferably up to 75%, preferably up to 80%, preferably up to 85%, preferably up to 90%, preferably up to 95% of the surface area of the magnetic core is covered by the branched polyethylenimine.

In a preferred embodiment, a weight percentage of the magnetic core relative to a total weight of the composite is 40 wt % to 75 wt %, preferably 45 wt % to 70 wt %, preferably 50 wt % to 65 wt %, preferably 55 wt % to 60 wt %.

In one or more embodiments, the composite of the present disclosure has a surface area of 140-200 $m^2/g$, 150-190 $m^2/g$, 160-180 $m^2/g$, or 165-170 $m^2/g$. In a related embodiment, the composite has a pore volume of 0.2-0.3 $cm^3/g$, 0.22-0.28 $cm^3/g$, 0.23-0.26 $cm^3/g$, or 0.24-0.25 $cm^3/g$. In another related embodiment, the composite is mesoporous with a pore size of 4-10 nm, 5-8 nm, or 5.5-7 nm.

According to a second aspect, the present disclosure relates to a method of preparing the composite of the first aspect, wherein the activated carbonyl group is an acyl halide group. The method involves the steps of (i) treating an activated carbon with an acid to form a carboxylated carbon, (ii) mixing the carboxylated carbon, a Fe(II) salt, a Fe(III) salt, and a base in the presence of a solvent to form a mixture, (iii) heating the mixture to form a magnetic carbon, (iv) mixing the magnetic carbon and a halide reagent to form a magnetic core, and (v) reacting the magnetic core with the branched PEI, thereby forming the composite, wherein the halide reagent is at least one selected from the group consisting of a thionyl halide, an oxalyl halide, phosphorus trihalide, and phosphorous pentahalide.

Preferably, the activated carbon is produced from waste tires. In one or more embodiments, the activated carbon is produced by granulating and pyrolyzing waste tires. For example, pieces of waste tires may be collected from a dumping site, cleaned with water, and optionally cut and ground to granular form. The granules may be dried at a temperature of 80-160° C., 90-140° C., or 100-120° C. to form dried granules. The dried granules may be subjected to pyrolysis via heating at a temperature of 200-600° C., 250-550° C., 300-500° C., or 350-450° C. for 30-600 minutes, 60-500 minutes, 90-400 minutes, 120-300 minutes, 150-270 minutes, or 180-240 minutes to form carbonized particles. The pyrolysis may be conducted in inert gas (e.g. nitrogen, argon, helium) within an oven or furnace. Also, in some embodiments, the dried granules may not be pyrolyzed in inert gas, but in a vacuum. Further purification of the carbonized particles may be optionally accomplished via $H_2O_2$ treatment in order to eliminate adhering organic impurities. The carbonized particles may be activated by heating at a temperature of 500-1,000° C., 550-950° C., 600-900° C., 650-850° C., or 700-800° C. for 1-8 hours, 2-7 hours, 3-6 hours, or about 5 hours to form the activated carbon. The activation may be performed within a steam-enriched muffle furnace or an oven. In certain embodiments, the carbonized particles may not be activated via heating in steam, but in air, or oxygen-enriched air.

The Brunauer-Emmet-Teller (BET) theory (S. Brunauer, P. H. Emmett, E. Teller, *J. Am. Chem. Soc.* 1938, 60, 309-319, incorporated herein by reference) aims to explain the physical adsorption of gas molecules on a solid surface and serves as the basis for an important analysis technique for the measurement of a specific surface area of a material. Specific surface area is a property of solids which is the total surface area of a material per unit of mass, solid or bulk volume, or cross sectional area. In most embodiments, pore diameter, pore volume, and BET surface area are measured by gas adsorption analysis, preferably $N_2$ adsorption analysis (e.g. $N_2$ adsorption isotherms). In one or more embodiments, the activated carbon described herein has a BET surface area of 500-1,000 $m^2/g$, preferably 520-800 $m^2/g$, preferably 540-700 $m^2/g$, preferably 560-650 $m^2/g$, preferably 570-620 m²/g, preferably 580-600 m²/g. In a related embodiment, the activated carbon has an average pore diameter of 3-8 nm, preferably 3.5-7.5 nm, preferably 4-7 nm, preferably 4.5-6.5 nm, preferably 5-6 nm. In another related embodiment, the activated carbon has a pore volume of 0.25-4 cm³/g, preferably 0.5-3 cm³/g, preferably 0.6-2.5 cm³/g, preferably 0.7-2 cm³/g, preferably 0.8-1.5 cm³/g, preferably 0.9-1.2 cm³/g.

Carboxylated carbon may be prepared according to methods known to one of ordinary skill in the art. For example, carboxylated carbon may be prepared by treating the aforementioned activated carbon with an acid, e.g. HF, $HNO_3$, $H_2SO_4$, $H_3PO_4$, $HClO_4$, and mixtures thereof, thereby forming an acidic mixture. Preferably, the acid is $HNO_3$ with a nitric acid concentration of 2-6 M, 3-5 M, or about 4M. The acidic mixture may be agitated and/or heated at 50° C. to 150° C., 70° C. to 120° C., 80° C. to 100° C., or at around 90° C. for 0.5-24 hours, 1-12 hours, 2-6 hours, or about 3 hours to form a reaction mixture. Carboxylated carbon may be collected from the reaction mixture and further purified using methods known to one of ordinary skill in the art. The extent of carboxyl functionalization is dependent upon a number of factors, e.g. the reactivity of the activated carbon, the reactivity of functionalizing agent, steric effect, etc. The extent of carboxyl functionalization is characterized by a percentage of the number of carboxyl functionalized carbon atoms relative the total number of carbon atoms in a particle. In some embodiments, a percentage of carboxyl functionalization is in the range of 0.1-30%, preferably 1-20%, preferably 5-15% of carboxyl functionalized carbon atoms relative to the total number of carbon atoms in the carboxylated carbon described herein. The extent of carboxyl functionalization may be determined by various analytical tools including, but not limited to, scanning tunneling microscopy (SEM), atomic force microscopy (AFM), X-ray photoelectron spectroscopy (XPS), XRD, Raman spectroscopy, $^{13}$C-NMR spectroscopy, IR spectroscopy, and acid-base titration.

The carboxylated carbon is then mixed with a Fe(II) salt, a Fe(III) salt, and a base in the presence of a solvent to form a mixture.

Suitable exemplary Fe(II) salts include, but are not limited to, iron(II) sulfate, iron(II) sulfate heptahydrate, iron(II) chloride, ammonium iron(II) sulfate, iron(II) bromide, iron (II) iodide, iron(II) fluoride, and iron(II) tetrafluoroborate. In a preferred embodiment, the Fe(II) salt is iron(II) sulfate, more preferably iron(II) sulfate heptahydrate ($FeSO_4 \cdot 7H_2O$). Suitable exemplary Fe(III) salts include, but are not limited to, iron(III) chloride, iron(III) chloride hexahydrate, iron(III) nitrate, ammonium iron(III) citrate, iron (III) citrate, iron(III) fluoride, iron(III) phosphate, and iron (III) sulfate. In a preferred embodiment, the Fe(III) salt is iron(III) chloride.

As used herein, the term "solvent" includes, but is not limited to, water (e.g. tap water, distilled water, deionized water, deionized distilled water), organic solvents, such as ethers (e.g. diethyl ether, tetrahydrofuran, 1,4-dioxane, tetrahydropyran, t-butyl methyl ether, cyclopentyl methyl ether, di-iso-propyl ether), glycol ethers (e.g. 1,2-dimethoxyethane, diglymer, triglyme), alcohols (e.g. methanol, ethanol, trifluoroethanol, n-propanol, i-propanol, n-butanol, i-butanol, t-butanol, n-pentanol, i-pentanol, 2-methyl-2-butanol, 2-trifluoromethyl-2-propanol, 2,3-dimethyl-2-butanol, 3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropyl-methanol, cyclopropanol, cyclobutanol, cyclopentanol, cyclohexanol), aromatic solvents (e.g. benzene, o-xylene, m-xylene, p-xylene, mixtures of xylenes, toluene, mesitylene, anisole, 1,2-dimethoxybenzene, α,α,α-trifluoromethylbenzene, fluorobenzene), chlorinated solvents (e.g. chlorobenzene, dichloromethane, 1,2-dichloroethane, 1,1-dichloroethane, chloroform), ester solvents (e.g. ethyl acetate, propyl acetate), urea solvents, ketones (e.g. acetone, butanone), acetonitrile, propionitrile, butyronitrile, benzonitrile, dimethyl sulfoxide, ethylene carbonate, propylene carbonate, 1,3-dimethyl-3,4,5,6-tetrahydro-2(1H)-pyrimidinone, and mixtures thereof. As used herein solvent may refer to non-polar solvents (e.g. hexane, benzene, toluene, diethyl ether, chloroform, 1,4-dioxane), polar aprotic solvents (e.g. ethyl acetate, tetrahydrofuran, dichloromethane, acetone, acetonitrile, dimethylformamide, dimethyl sulfoxide), and polar protic solvents (e.g. acetic acid, n-butanol, isopropanol, n-propanol, ethanol, methanol, ethylene glycol, diethylene glycol, triethylene glycol, formic acid, water), and mixtures thereof. In a preferred embodiment, the solvent used herein is a polar protic solvent, preferably water, an alcohol (e.g. ethanol, methanol, n-butanol, isopropanol, n-propanol), a diol (e.g. ethylene glycol, diethylene glycol, triethylene glycol), or a mixture thereof. Most preferably the solvent is a mixture of water, ethanol, and ethylene glycol.

The base employed in the mixture may be a hydroxide base, such as an alkali metal hydroxide (e.g., lithium hydroxide, sodium hydroxide, potassium hydroxide, rubidium hydroxide, and cesium hydroxide), an alkali earth metal hydroxide (e.g., magnesium hydroxide, calcium hydroxide, strontium hydroxide, and barium hydroxide), and an ammonium hydroxide (e.g., ammonium hydroxide, tetramethylammonium hydroxide, triethylammonium hydroxide, trimethylanilinium hydroxide, etc.). In preferred embodiments, the base is sodium hydroxide, ammonium hydroxide, or both. In a preferred embodiment, the mixture has a pH in a range of 8-14, 8.5-13.5, The mixing may occur via stirring, shaking, sonicating, blending, or by otherwise agitating the mixture. In one embodiment, the Fe(II) salt and the Fe(III) salt may be mixed in the solvent by stirring for 2-24 hours, preferably 6-12 hours, or about 8 hours first, and then other components (e.g. the base) may be added and mixed via stirring to adjust the pH of the mixture. The mixture is then heated at a temperature of 70-150° C., preferably 80-120° C., more preferably about 90° C. for 1-24 hours, preferably 2-12 hours, more preferably 4-8 hours to form a precipitate. The precipitate may be separated from the mixture for example using an external magnet, or by filtration, centrifugation, decantation, and the like, and optionally washed with water. The precipitate may then be dried at a temperature of 30-150° C., preferably 50-120° C., preferably 60-100° C., or about 80° C. under standard pressure or under vacuum, thereby forming the magnetic carbon.

In one or more embodiment, the magnetic core with acyl halide as the activated carbonyl groups can be prepared by reacting the aforementioned magnetic carbon with a halide reagent at 25° C. to 100° C., 35° C. to 95° C., 45° C. to 85° C., or 55° C. to 75° C.

In one embodiment, the halide reagent is at least one selected from the group consisting of a thionyl halide, an oxalyl halide, phosphorus trihalide, and phosphorous pentahalide. Non-limiting examples of halide reagent useful for the present method include thionyl chloride, thionyl bromide, oxalyl chloride, oxalyl bromide, phosphorus trichloride ($POCl_3$), phosphorus tribromide, phosphorous pentachloride ($POCl_5$), and phosphorous pentabromide. Preferably, a thionyl halide is used as the halide reagent. Most preferably, thionyl chloride is used. In one embodiment, the thionyl reagent is present in a molar excess to the magnetic carbon. For example, the molar ratio of the thionyl halide (e.g. thionyl chloride) to the magnetic carbon is 2:1 to 1,000:1, 3:1 to 750:1, 4:1 to 500:1, 5:1 to 100:1, 6:1 to 50:1, 7:1 to 25:1, 8:1 to 15:1, or 10:1 to 12:1.

The magnetic cores may be reacted with a branched PEI, preferably a PEI as previously specified, thereby forming the composite. The magnetic cores may be used in without purification from the previous reaction (i.e. reaction of the magnetic carbon with the halide reagent). Alternatively, the magnetic cores may be collected, for example with an external magnet, before being reacted with the branched PEI. In one embodiment, the reacting is performed at a temperature of 30-120° C., preferably 50-90° C., more preferably 60-70° C. for 3-36 hours, preferably 6-24 hours, more preferably 9-15 hours, or about 12 hours. The composite may be collected, separated (filtered off), crushed, and dried. The composite may be optionally dried under standard pressure or under vacuum until a constant weight is achieved.

According to a third aspect, the present disclosure relates to a method for removing a pollutant from an aqueous solution. The method involves contacting the aqueous solution having an initial concentration of the pollutant with the composite of the first aspect to form a mixture, and filtering the mixture to obtain a pollutant loaded composite and an aqueous solution having a reduced concentration of the pollutant compared to the initial concentration. In one or more embodiments, the pollutant is an organic dye, a heavy metal, or both.

The composite described herein may be optionally crushed to form particles of the composite before contacting the aqueous solution. The crushing process may be carried out by utilizing a grinding method, e.g. fluid energy milling, ball milling, wet milling, and cryogenic grinding. In one embodiment, the composite used herein has an average particle size of 1-200 µm in diameter, 2-150 µm, 5-100 µm, 10-50 µm, or 15-25 µm in diameter. Methods for analyzing a distribution of particle size include, but are not limited to, dynamic light scattering (DLS), laser diffraction, ultrasonic attenuation spectroscopy, aerosol mass spectrometry, and sieve analysis. The particle size of the composite may be further visualized with microscopic techniques, such as polarized light microscopy and scanning electron microscopy (SEM), and dynamic image analysis (DIA).

An adsorption process may be achieved in a batch or column system. Batch experiments are often carried out to determine the effectiveness of adsorption for the removal of specific adsorbates and to measure the maximum adsorption capacity. On the other hand, continuous adsorption can be carried out in a packed bed column. Continuous adsorption is considered more favorable from the industrial point of view, because it is relatively simple to operate and scale up [B. O. Isiuku, M. Horsfall, A. I. Spiff, Res. J. Appl. Sci.9 (2014) 238-243]. Materials used for packing the columns included NaOH-activated cassava peels carbon for removing methyl red [B. O. Isiuku, M. Horsfall, A. I. Spiff, Res. J. Appl. Sci.9 (2014) 238-243, incorporated herein by reference in its entirety], and phoenix tree leaf powder for removing methylene blue [Han, Yu Wang, Xin Zhao, Yuanfeng Wang, Fuling Xie, Junmei Cheng, Mingsheng Tang, Desalination, 245, 1-3, 2009, 284-297, incorporated herein by reference in its entirety].

Examples of aqueous solutions (i.e. organic dye and/or heavy metal contaminated aqueous solutions), water sources and systems applicable to the present method include, but are not limited to, surface water that collects on the ground or in a stream, aquifer, river, lake, reservoir or ocean, ground water that is obtained by drilling wells, run-off, industrial water (e.g. contaminated water generated by textile industry), public water storage towers, public recreational pools and/or bottled water. Methods for removing heavy metals from aqueous solutions according to the present disclosure include contacting the composite of the present disclosure in any of its embodiments with the contaminated water sources and systems. The methods may be carried out in tanks, containers, or small scale applications in both batch mode and fixed-bed or column mode.

Exemplary organic dyes that may be removed by the method disclosed herein using the composite include, but are not limited to, methyl green, methylene blue, malachite green, brilliant green, brilliant blue FCF, new methylene blue, methyl blue, methyl purple, thymol blue, rhodamine B, methyl violet 2B, methyl violet 6B, crystal violet, phenol red, acid green 5, basic fuchsin, acid fuchsin, patent blue V, pararosaniline, Victoria blue B, Victoria blue FBR, Victoria blue BO, Victoria blue FGA, Victoria blue 4 R, Victoria blue R, and azo dyes such as methyl orange, methyl red, methyl yellow, Congo red, direct blue 1, basic red 18, direct brown 78, trypan blue, disperse orange 1, alizarine yellow R, Sudan III, Sudan IV, Sudan black B, and orange G. The method disclosed herein may remove one or more organic dyes present as the pollutant in the mixture.

In preferred embodiments, the organic pollutant comprises at least one azo dye, preferably methyl red. Methyl red (2-(4-dimethylaminophenylazo)benzoic acid) is an anionic azo dye that is commonly used in laboratories as an acid-base indicator, and widely applied in industries for textile dyeing and paper printing [H. Lachheb, E. Puzenat, A. Houas, et al. Applied Catalysis B Environmental, 39 (2002), 75-90]. Methyl red can cause skin redness, eye irritation, and digestive tract damage [Y. Badr, M. G. Abdul El-Wahed, M. A. Mahmoud. J Hazard Mater, 154 (2008), pp. 245-253]. Therefore, effective removal or treatment of methyl red from wastewater to minimize its impact on the environment is essential.

Exemplary metal ions that can be adsorbed by the composite of the present disclosure are of a wide range and include, but are not limited to, ions of Ag, Na, Pb, Mn, Fe, Co, Ni, Cu, Sn, Cd, Hg, Cr, Fe, As, Sb, Cr, Zn, V, Pt, Pd, Rh and mixtures thereof in various oxidation states such as +1, +2 and +3. Further, these metal ions may be of any oxidation state $M^{+1}$, $M^{+2}$, $M^{+3}$, etc. In a preferred embodiment, the heavy metal applicable to the present method is an ion of at least one heavy metal selected from the group consisting of Cd, Pb, Cu, Cr, Ni, and As. It is equally envisaged that the composite may be adapted or chemically modified to adsorb, incorporate and/or bind additional metal ions in addition to, or in lieu of the aforementioned heavy metal ions and may bind selectively or collectively. In one embodiment, the additional metal ion may be any ion which is suitably coordinated by the composite disclosed herein in any of its embodiments. Exemplary additional metal ions include, but are not limited to, ions of an alkali metal (Li, Na, K, etc.), an alkaline earth metal (Mg, Ca, Sr, etc.), a lanthanide metal (La, Ce, Eu, Yb, etc.), an actinide metal (Ac, Th, etc.), or a post-transition metal (Al, Sn, In, etc.). Preferably the additional metal ion is a transition metal ion, most preferably a heavy metal ion.

As used herein, adsorption is the adhesion of atoms, ions or molecules from a gas, liquid, or dissolved solid to a surface. The process creates a film of an adsorbate (i.e. organic dyes, heavy metal ions) on the surface of an adsorbent (i.e. the composite). This process differs from absorption, in which a fluid (the absorbate) permeates or is dissolved by a liquid or solid (the absorbent). Adsorption is a surface-based process while absorption involves the whole volume of the material. The term sorption encompasses both processes, while, desorption is the reverse of it. As used herein, chemisorption is a kind of adsorption which involves a chemical reaction between the adsorbate and adsorbent. New chemical bonds are generated at the adsorbent surface. In contrast with chemisorption is physisorption, which leaves the chemical species of the adsorbate and adsorbent intact and the electronic structure of the atom or molecule is barely perturbed upon adsorption. In terms of the present disclosure, the adsorption may be chemisorption, physisorption, or mixtures thereof. In at least one embodiment, the organic dye (e.g. methyl red) is removed by chemisorption with the composite of the current disclosure.

In one or more embodiments, the composite of the current disclosure is present in the aqueous solution in a concentration in a range of 0.01-50 grams per liter of the aqueous solution during the contacting, preferably 0.1-25 g $L^{-1}$, preferably 0.125-20 g $L^{-1}$, preferably 0.25-15 g $L^{-1}$, preferably 0.5-10 g $L^{-1}$, preferably 1-5 grams per liter of the aqueous solution during the contacting.

In one embodiment, the composite is effective in adsorbing the pollutant in an aqueous solution within a temperature range of 4-100° C., preferably 15-75° C., preferably 20-50° C., preferably 25-35° C. In a preferred embodiment, the composite is contacted with the aqueous solution at a temperature in a range of 10-65° C., preferably 18-45° C., more preferably 22-28° C.

In a preferred embodiment, the composite of the present disclosure is contacted with the aqueous solution for 1 minute to 24 hours, preferably 5 minutes to 12 hours, preferably 10 minutes to 10 hours, preferably 15 minutes to 8 hours, preferably 20 minutes to 6 hours, preferably 30 minutes to 4 hours, preferably 45 minutes to 2 hours, preferably 1 hour to 1.5 hours.

In one embodiment, the composite is effective in removing the pollutant (e.g. the organic dye, the heavy metal ions) from the aqueous solution wherein the initial concentration of the pollutant, preferably methyl red, in the aqueous solution is in a range of 0.01 mM to 100 mM, preferably 0.1 mM to 10 mM, more preferably 1 mM to 5 mM.

In one or more embodiments, greater than 50% of a total mass of the pollutant (e.g. methyl red) is removed from the aqueous solution at the end of the adsorption process following contacting, preferably greater than 55%, preferably greater than 60%, preferably greater than 65%, preferably greater than 70%, preferably greater than 75%, preferably greater than 80%, preferably greater than 85%, preferably greater than 90%, preferably greater than 92%, preferably greater than 95%, preferably greater than 97%, preferably greater than 98%, preferably greater than 99% of a total mass of the pollutant (e.g. methyl red) is removed from the aqueous solution at the end of the adsorption process following contacting.

Adsorption is a key mechanism of removing pollutants in the present disclosure, which requires contact between an adsorbent material (the composite) and a target adsorbate (the organic dye, the heavy metal ions). There is generally an increase in the removal efficiency with increasing agitation speed until a certain level. In certain embodiments, the method further comprises agitation of the aqueous solution before, during or after the contacting. The agitation may encompass shaking, stirring, rotating, vibrating, sonication and other means of increasing contact between the composite of the current disclosure and heavy metal ions. Further, the agitation can be performed manually or mechanically. In one embodiment, the treatment and contacting process may be enhanced by mechanical shaking or agitation, preferably by a magnetic stirrer or a shaker at a speed of up to 1000 rpm, preferably up to 750 rpm, preferably up to 500 rpm, preferably 50-450 rpm, preferably 75-375 rpm, preferably 200-300 rpm in order to increase contact between the composite and the pollutants.

In one embodiment, the method further involves recovering and reusing a pollutant loaded composite after an around of adsorption process. In certain embodiments, the pollutant loaded composite may be obtained from the aqueous solution with methods including, but not limited to, external magnetic extraction, filtration, centrifugation, evaporation, heated evaporation and the like, preferably external magnetic extraction. In certain embodiments, the obtained pollutant loaded composite may be washed several times with an appropriate solvent and/or reagent to remove all materials present after each round of pollutant absorption before being regenerated and reused and/or recycled in another round of removal of pollutants from an aqueous solution.

The composite of the present disclosure may be freestanding or supported on or within a substrate, for example, a column. A fourth aspect of the present disclosure relates to a filtration system including the composite. The filtration system may include the composite of the present disclosure disposed in an internal cavity of a tube. The composite used herein may be preferably in the form of particles with an average particle size of 1-200 μm in diameter, 2-150 μm, 5-100 μm, 10-50 μm, or 15-25 μm in diameter. The tube may have a volume in a range of 0.001 to 1,000 L, preferably 0.01 to 500 L, preferably 0.05 to 250 L, preferably 0.1 to 100 L, preferably 1 to 50 L, preferably 5 to 10 L. The composite may preferably occupy at least 20%, preferably at least 30%, preferably at least 40%, preferably at least 50%, preferably at least 60%, preferably at least 70%, preferably at least 80%, but no more than 90% of a total volume of the tube.

The filtration system may further include an inlet configured to deliver an aqueous solution having an initial concentration of the pollutant to the internal cavity, and an outlet configured to reject an aqueous solution having a reduced concentration of the pollutant from the internal cavity. In one embodiment, the inlet and the outlet are substantially the same, wherein each is configured to load/unload a volumetric flow rate of up to 1000 ml/min, preferably 100 ml/min, more preferably up to 10 mL/min, or about 1 ml/min to or from the vessel.

In one embodiment, the filtration system is in the form of a packed bed column (i.e. fixed-bed column, see FIGS. 11A-C), wherein the composite is fixed in the internal cavity inside a column bed, and the aqueous solution is passed through the composite. Alternatively, the filtration system may be in the form of a fluidized-bed column, wherein the composite is floating in the internal cavity when the aqueous solution is passed through the composite. In a related embodiment, the filtration system of the present disclosure contains at least one adsorbing material that is not the composite. For example, the column bed of the filtration system has a mixture of the composite (Material B) and the magnetic carbon (material A) arranged alternatively inside the column bed (see FIG. 11C).

The examples below are intended to further illustrate protocols for preparing, characterizing the composite, and uses thereof, and are not intended to limit the scope of the claims.

Example 1

Materials

Chemicals used in this disclosure include: ferrous sulphate, ferric chloride, ammonia, sodium hydroxide, hydrogen peroxide, polyethylenimine, and nitric acid.

Example 2

Preparation of AC from WRTs

AC was derived from waste rubber tires (WRTs). Briefly, WRTs were cut into small pieces to fit into the crucible. This is an important step because isolating iron wire from the tire is time-consuming. WRTs were then cleaned, and grounded to small pieces, which were washed thoroughly with deionized water and dried in an oven at 110° C. for two hours. The granules obtained were heated to 300° C. to isolate the produced oil, distilled diesel oil, and black tire crude oil. Carbonization was carried out in a muffle furnace at 500° C. for five hours to remove the ash and carbon black from pyro-gas and other oils. The char was then treated with $H_2O_2$ to oxidize the impurities. It was then washed using deionized water and dried in a vacuum oven overnight. In order to enhance the porosity of the carbonaceous material, the carbon black was activated at 900° C. for five hours. The AC was washed with deionized water and dried in an oven overnight. The dried AC was next treated with 4M $HNO_3$ (1 g AC: 15 mL $HNO_3$) at 90° C. for three hours to develop acidic functional groups on the surface to further enhance adsorption [T. A. Saleh. Applied Surface Science, 2011, 257, 7746-7751, incorporated herein by reference in its entirety]. The AC was then washed thoroughly and dried at 110° C. for 24 h.

Example 3

Iron Loading on AC (AC-Fe)

28.0 g of AC were dispersed in a solution of 300 mL of deionized water, 200 mL of ethanol, and 50 mL of diethylene glycol. Then, the mixture was magnetically stirred for 6 hours. After that, 9.94 g of ferrous sulphate ($FeSO_4 \cdot 7H_2O$) were dissolved in 50 mL of deionized water and the solution was added to the mixture drop-wise. In addition, 26.1 g of Ferric chloride ($FeCl_3$) were dissolved in 100 mL of deionized water and the $FeCl_3$ solution was added to the mixture drop-wise. After that, the mixture was left for stirring for 8 hours. Next, a solution of NaOH was added to the mixture until the PH reached to around 7. After that, $NH_3$ was added to increase the PH above 8. Then, the mixture was stirred and heated under reflux at 90° C. for 6 hours. After that, the mixture was centrifuged at a speed of 10,000 rpm at a temperature of 4° C. for 30 minutes followed by washing until the PH reached to around 7. Finally, the sample was collected and left to dry for overnight in an oven at a temperature of 80° C. The procedure is summarized in FIG. 1B.

Example 4

Modification of AC by PEI

Figure 1B:
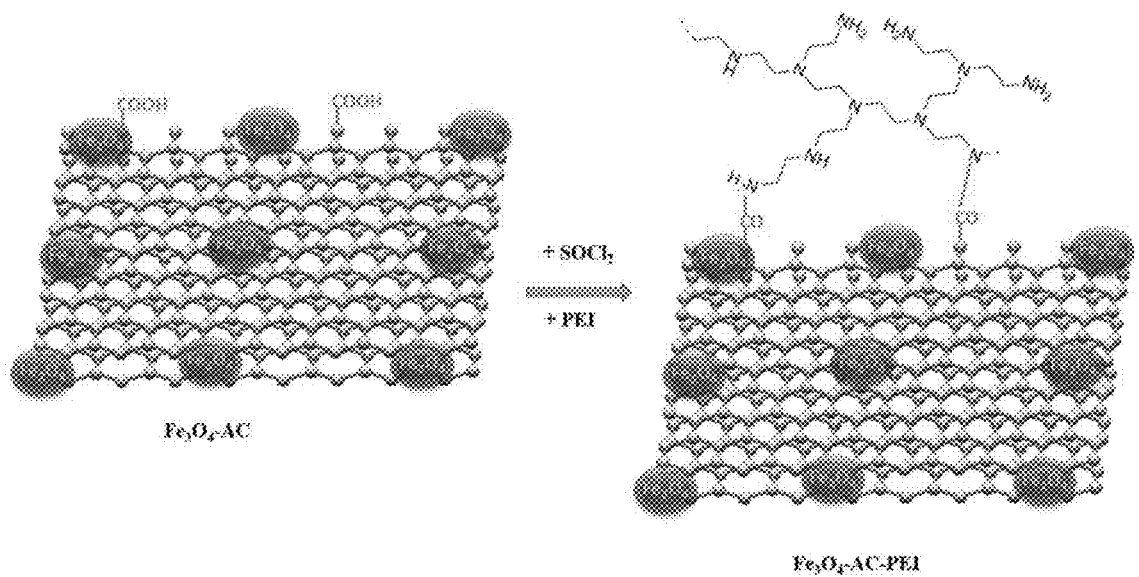
FIG. 1B is a schematic illustration showing the preparation of the composite.

30% of PEI stock solution in water was added to a solution having a mixture of magnetic-AC and $SOCl_2$ in a round-bottom flask. The obtained mixture was stirred for 12 h at 60° C. The mixture was then allowed to cool and filtered. FIG. 1C shows the loading of PEI on modified activated carbon.

Example 5

Characterization

The surface area pore volume and pore size distribution of the synthesized material was characterized by adsorption/desorption of nitrogen at (−196° C.) on a Micromeritics TriStar surface area and porosimetry analyzer (Micromeritics, USA).

The X-ray diffraction pattern of the adsorbent was taken by a Rigaku Miniflex II desktop X-ray diffractometer using Cu-Kα radiation and an X-ray gun operated at 40 kV voltage, 200 mA current, and λ=1.54 Å using powdered samples. Data was collected from 2θ=0-80° at a scan rate of 4°/min to analyze the atomic and molecular structure of the adsorbent. The atoms present in the adsorbent were determined and the relative intensities were also taken.

Example 6

Scanning Electron Microscopy/Elemental Dispersive Spectroscopy

Scanning electron microscopy (SEM) analysis of the treated samples was conducted using low vacuum JEOL (JSM-6610LV Scanning Electron Microscope (SEM) equipped with tungsten electron gun. The energy dispersive X-ray spectroscopy (EDX) analysis was conducted to understand the composition of the synthesized materials. EDX is an analytical technique used for chemical characterization and elemental analysis.

Example 7

Fourier Transform Infrared Spectroscopy

The FT-IR spectrum of the synthesized adsorbent was recorded on Nicolet 6700 spectrometer (Thermo electron, USA) with a resolution of 2.0 $cm^{-1}$ well equipped with Deuterated triglycine sulfate detector and OMNIC program. The experiments were conducted on powdered samples grounded in an agate mortar to produce KBr pellets. FT-IR spectra were obtained with 64 scans and corrected for the background noise. The spectra of the samples were recorded in transmission mode and the wavenumber ranged from 4000-400 $cm^{-1}$.

Example 8

Thermogravimetric Analysis and Differential Scanning Calorimetry (TGA and DSC)

The analysis was conducted to understand the thermal stability of the adsorbent. SDT (Simultaneous DSC and TGA) Q600 TA Instruments was used for the analysis. The thermal stability of sorbents was tested by heating to 800° C. About 10-15 mg of the sorbent was heated using a Platinum/Platinum-Rhodium (Type R) thermocouples.

Example 9

Absorption Evaluation

Batch Adsorption

The adsorption experiment was carried out in both batch and fixed bed models. In the first run of the batch system, 20 mg of the adsorbent material was mixed with 40 mL solution of 0.001 M methyl red in a flask. Then the mixture was magnetically stirred at a speed of 300 rpm. 2 mL of sample was collected at different time intervals. Then, the concentration of methyl red in each sample was measured by UV-Vis. The methyl red removal efficiency was calculated using the formula below:

$$\% \text{ removal} = (Co-Ce)/Co *100\% \quad (1)$$

where x=methyl red removal percentage (%) $C_0$=Initial concentration of methyl red, $C_e$=final methyl red concentration. The second run was performed in a similar fashion except that the mass of the adsorbent material was 10 mg instead of 20 mg.

Analysis Method

The concentration of the methyl red (MR) compound was analyzed by UV-vis spectroscopy. The analytical range was from 400 nm to 600 nm. The readings of the absorbance values were taken at a wavelength of 520 nm.

Data Analysis

The removal percentage (%) of MR after the equilibrium was calculated by the following equation:

$$\% \text{ Removal} = \frac{C_o - C_e}{C_o} \times 100 \quad (1)$$

In equations (2) and (3), the adsorption capacities $q_e$ (mg/g) and $q_t$ (mg/) are the amounts of MR adsorbed per unit mass of the material at equilibrium and at time t, respectively. Adsorption capacities were calculated by using the equations:

$$q_e = \frac{V(C_o - C_e)}{W} \quad (2)$$

$$q_t = \frac{V(C_o - C_t)}{W} \quad (3)$$

where $C_o$ (mole/L), $C_e$ and $C_t$ each stand for the initial concentration, the concentrations at the equilibrium, and at a given time t respectively. V (L) stands for the volume, and W (g) is the material mass.

Example 10

Results and Discussions: Characterization

Figure 2:
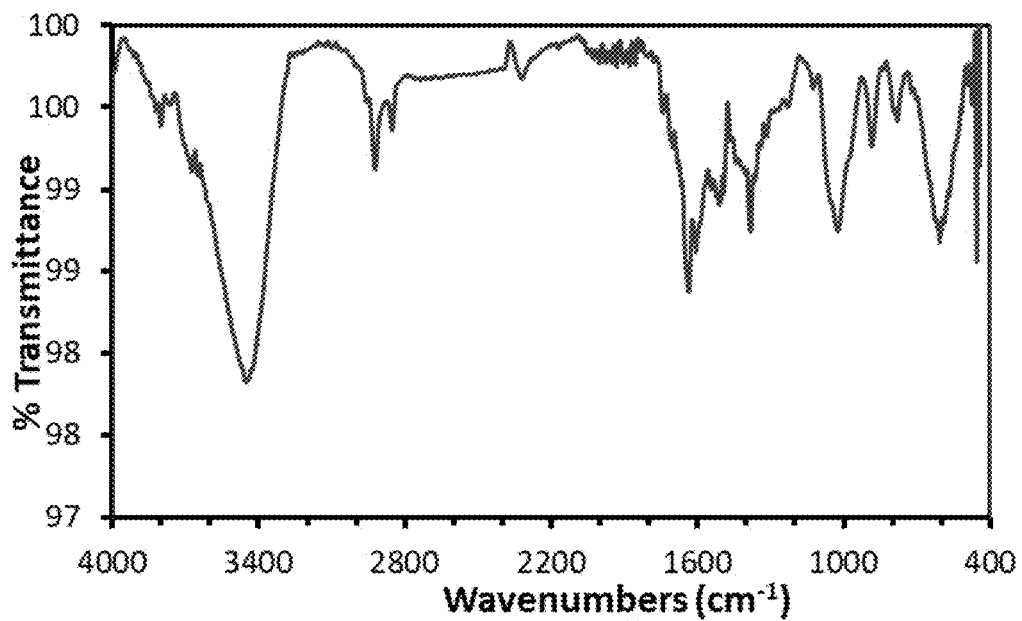
FIG. 2 is a Fourier transform infrared (FT-IR) spectrum of the composite.

As depicted in FIG. 2, FTIR spectra of all the adsorbents were obtained to understand the type of functional groups present on the surface of each adsorbent, and to monitor if there are similarities in the relative intensities of each functional group. Each adsorbent showed varying degrees of the relative intensities of the functional groups, but they all displayed a similar pattern. For instance, all adsorbents exhibited a peak at around 3500-3400 cm$^{-1}$, which can be assigned to O—H stretching vibrations of hydroxyl or carboxylic groups or due to chemisorbed water. They also displayed peaks at around 2900-2800 cm$^{-1}$ due to an aliphatic C—H stretch of CH, CH$_2$, and CH$_3$. The broad peaks between 1700-1600 cm$^{-1}$ were assigned to C=O stretching vibration in ketones and carboxylic acids respectively [N. Morlanes, Inter. Journal of Hydrogen Energy, 2013, 38, 3588-3596, incorporated herein by reference in its entirety]. Additionally, the peaks at 1400 cm$^{-1}$ and 2200-2400 cm$^{-1}$ are assigned to C=O stretching vibrations and double bonded carbon-oxygen groups [J. P. Chen and S. Wu, Langmuir, 2004, 20, 2233-2242; and X. Wu, X. Hong, Z. Luo, K. S. Hui, H. Chen, J. Wu, K. N. Hui, L. Li, J. Nan and Q. Zhang, Electrochim. Acta, 2013, 89, 400-406, each incorporated herein by reference in their entirety]. The peak that appeared at 1057 cm 1 was attributed to C—O stretching vibration. These peaks are characteristics of amorphous carbon. The band that appeared at around 1,080 cm$^{-1}$ was assigned to the Fe—O—C interaction [A. A. Ansari, P. R. Solanki and B. D. Malhotra, J. Biotechnol, 2009, 142, 179-184, incorporated herein by reference in its entirety]. The small peaks that appeared at 777 and 880 cm$^{-1}$ were attributed to the Fe—O bending vibrations, while the peak at 602 cm$^{-1}$ was due to the Fe—O stretching vibrations within the AC/Fe [M. Gotic and S. Music, Journal of Molecular Structure, 2007, 834-836, 445-453, incorporated herein by reference in its entirety]. These peaks confirmed the formation of the magnetic nanoparticles on the AC surface.

Figure 3A:
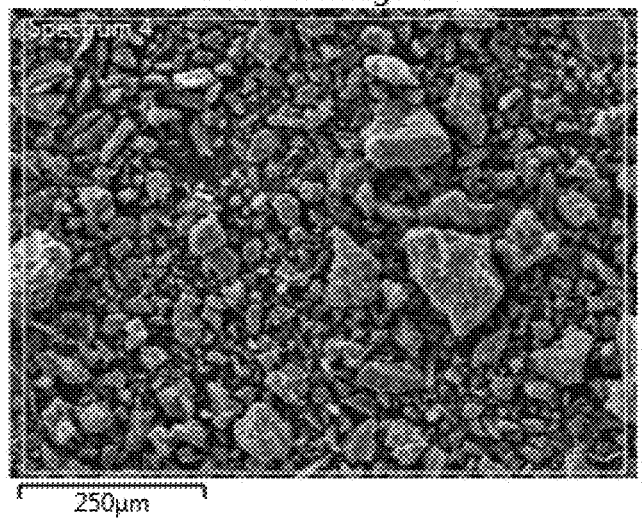
FIG. 3A is a scanning electron microscopy (SEM) image of the composite.
Figure 3B:
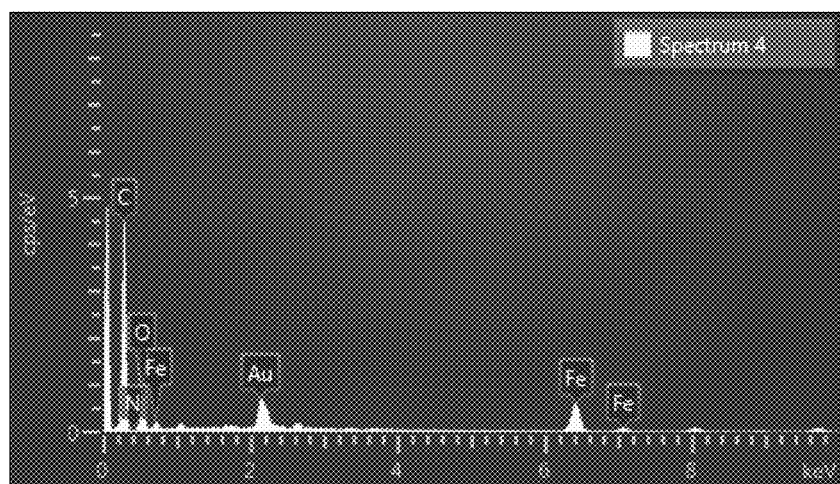
FIG. 3B is an energy dispersive X-ray (EDX) spectrum of the composite.
Figure 3C:
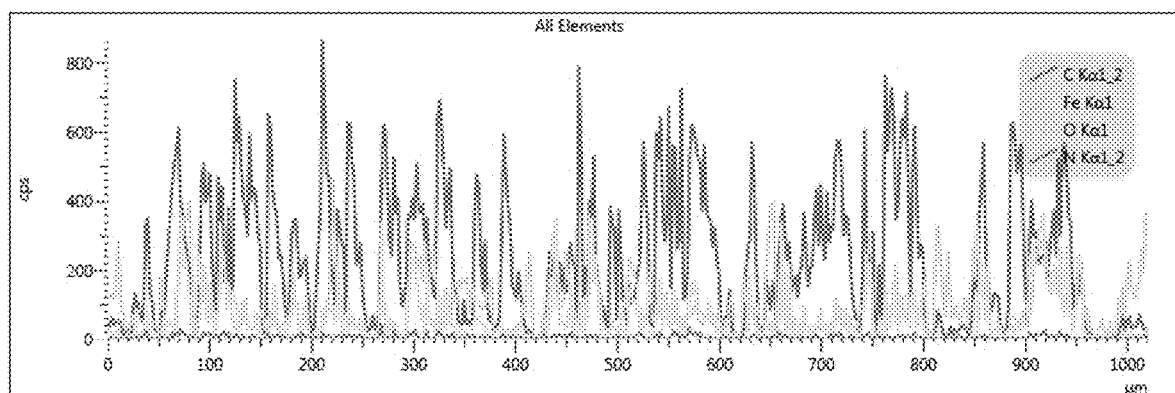
FIG. 3C is an EDX plot showing carbon, iron, oxygen, and nitrogen atoms of the composite.

The morphology of the synthesized adsorbents was characterized using SEM/EDX. FIGS. 3A-C show the SEM/EDX images displaying the surface structures, elemental compositions, and the porous nature of the adsorbents. The SEM/EDX/map images of FIGS. 3B-C showed that AC-Fe-PEI nanocomposite had a combination of Fe$_3$O$_4$ crystals and large crystals of Fe on the surface of the adsorbent.

Figure 4:
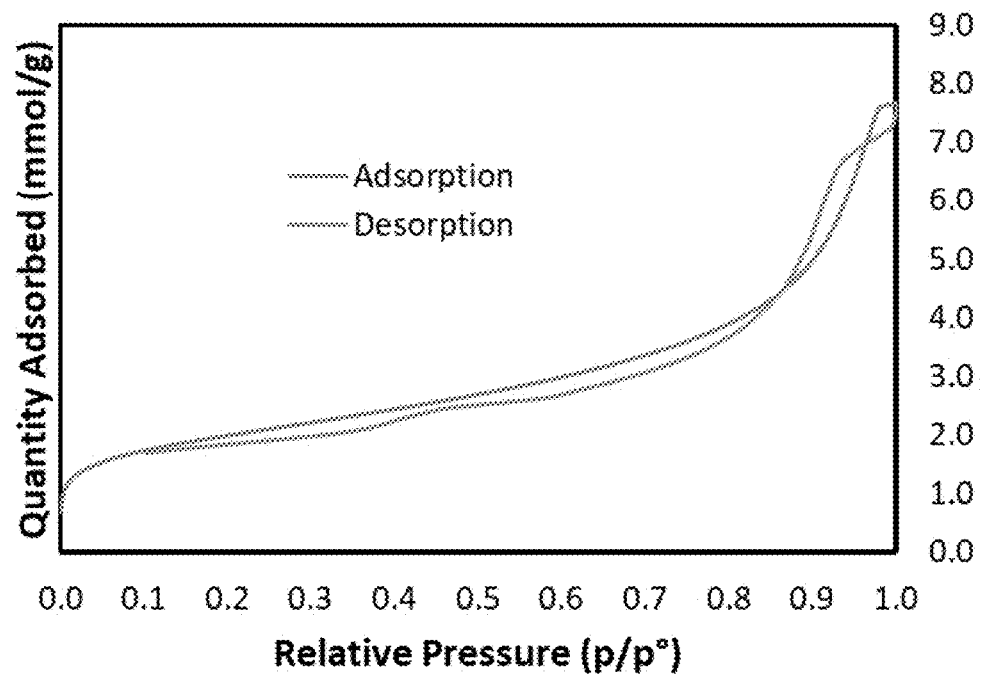
FIG. 4 shows $N_2$ adsorption-desorption isotherm of the composite.

Nitrogen adsorption-desorption isotherm is a useful tool to determine the porosity of carbonaceous materials. FIG. 4 shows the adsorption-desorption patterns of the synthesized AC and the metal loaded AC. The sample exhibited Type V isotherm classification [S. J. Gregg and K. S. W. Sing, Adsorption, Surface Area and Porosity. Academic Press, London, 1982; T. A. Saleh and G. I. Danmaliki, Journal of the Taiwan Institute of Chemical Engineers, 60, 2016, 460-468]. A hysteresis loop was observed at a relatively high pressure (0.8 to 1), indicating the presence of mesopores in all the samples [H. Deng, L. Yang, G. Tao and J. Dai, J. Hazard. Mater., 2009, 166, 1514-1521, incorporated herein by reference in its entirety]. Additionally, a low uptake of nitrogen was observed at relative pressures between 0 and 0.2, signifying the presence of small amounts of micropores within the samples [A. Min and A. T, Harris, ChemEngSci, 2006, 61, 8050-8059, incorporated herein by reference in its entirety]. It could be clearly seen that newly synthesized AC had the highest surface area and pore volume of 153 m$^2$/g, and 0.22 cm$^3$/g, respectively, while possessed the smallest pore size of 58 Å.

Figure 5:
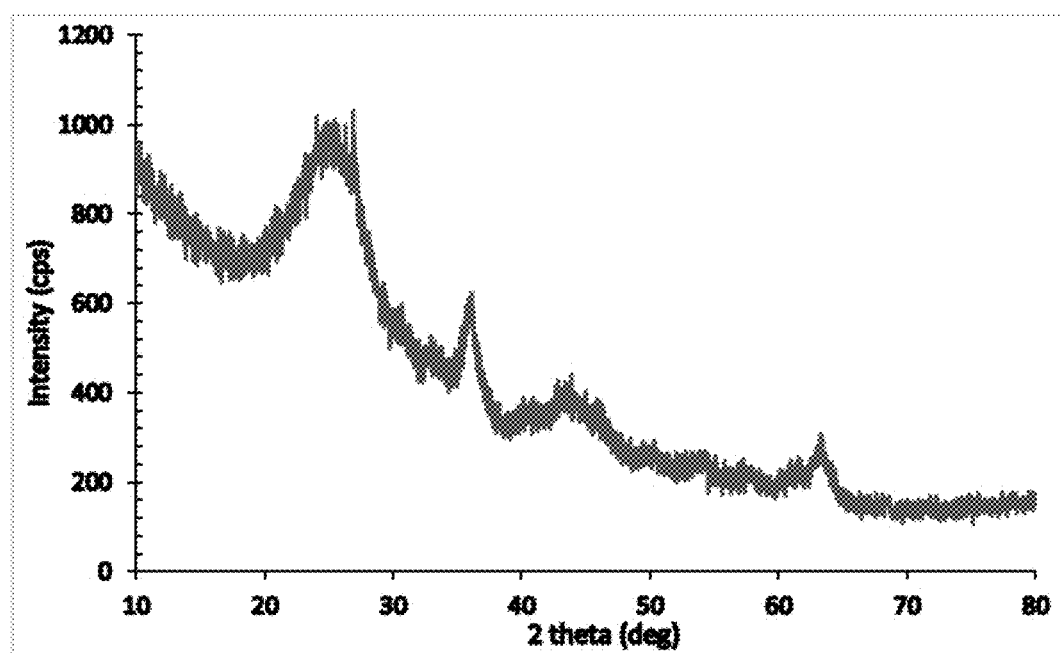
FIG. 5 shows X-ray diffraction (XRD) pattern of the composite.

XRD is an important characterization tool used in elucidating the elemental composition of various materials. Each element has a distinct diffraction pattern when exposed to X-ray light. FIG. 5 shows the XRD patterns of the synthesized material. The sample showed broad diffraction peaks at 2 Theta values of between 20 to 30° (002) and 40 to 50° (100), signifying the presence of amorphous carbon. These peaks were due to the creation of pores upon decomposition of carbon along the direction of graphitic structures, which also confirmed the semi-crystalline nature of AC. However, the relative intensities of the broad signals were less when compared to the loaded samples signifying replacement of the carbon surface with nanoparticles. Additional peaks were assigned to diffraction patterns corresponding to Fe.

Example 11

Results and Discussions: Batch System

Figure 6A:
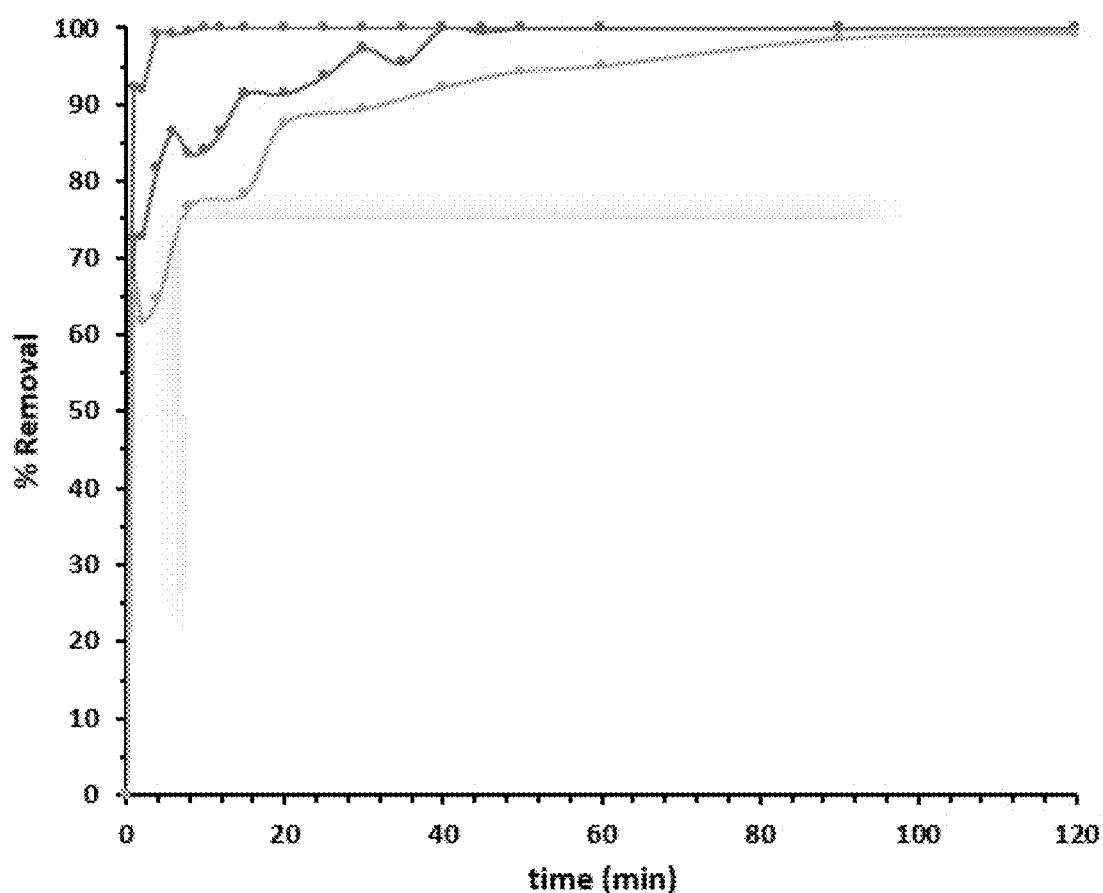
FIG. 6A is a graph showing the effects of initial concentration of dye in the aqueous solution and contacting time on the dye removal efficiency of the composite.
Figure 6B:
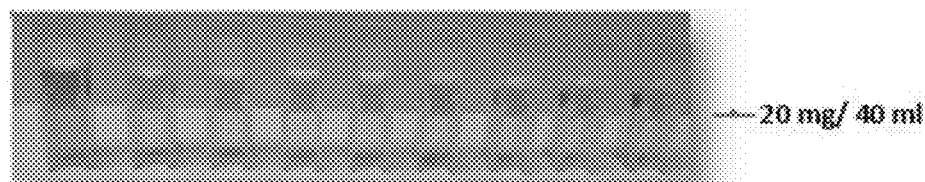
FIG. 6B is a picture showing samples collected at different time points when the aqueous solution with an initial concentration of 0.001 M methyl red is contacted with the composite in an amount of 0.5 g/L.
Figure 6C:
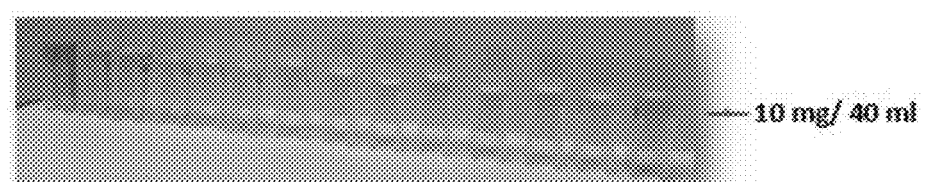
FIG. 6C is a picture showing samples collected at different time points when the aqueous solution with an initial concentration of 0.001 M methyl red is contacted with the composite in an amount of 0.25 g/L.
Figure 6D:
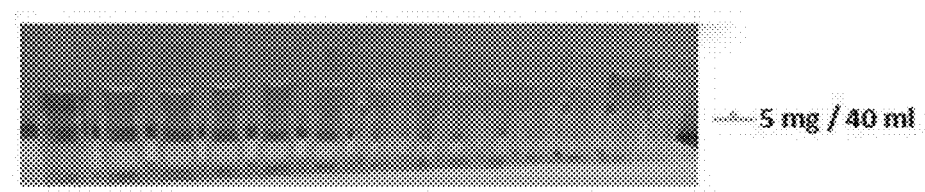
FIG. 6D is a picture showing samples collected at different time points when the aqueous solution with an initial concentration of 0.001 M methyl red is contacted with the composite in an amount of 0.125 g/L.

Percentage of removal was plotted versus time as shown in FIG. 6A. For the first run with 20 mg of the absorbent material (e.g. the composite), 100% removal was achieved within 6 mins. However, for the second run with 10 mg of the absorbent material, 100% removal was achieved after 40 mins.

Effect of the Contact Time & Dosage

The batch experiments with dosages of 5, 10, and 20 mg of the material were carried out at a temperature of 25° C. to study the effect of contact time on the metal uptake by the amount of adsorbent. The adsorption increases with increasing contact time until equilibrium was reached at ~ 10 min. Increasing the contact time after the equilibrium led to no considerable enhancement on the adsorption percentage.

Kinetics of the Adsorption

Two kinetic models (pseudo-first order and pseudo-second order) were employed to understand the mechanisms of MR adsorption on the material.

Pseudo First-Order Model

Figure 7A:
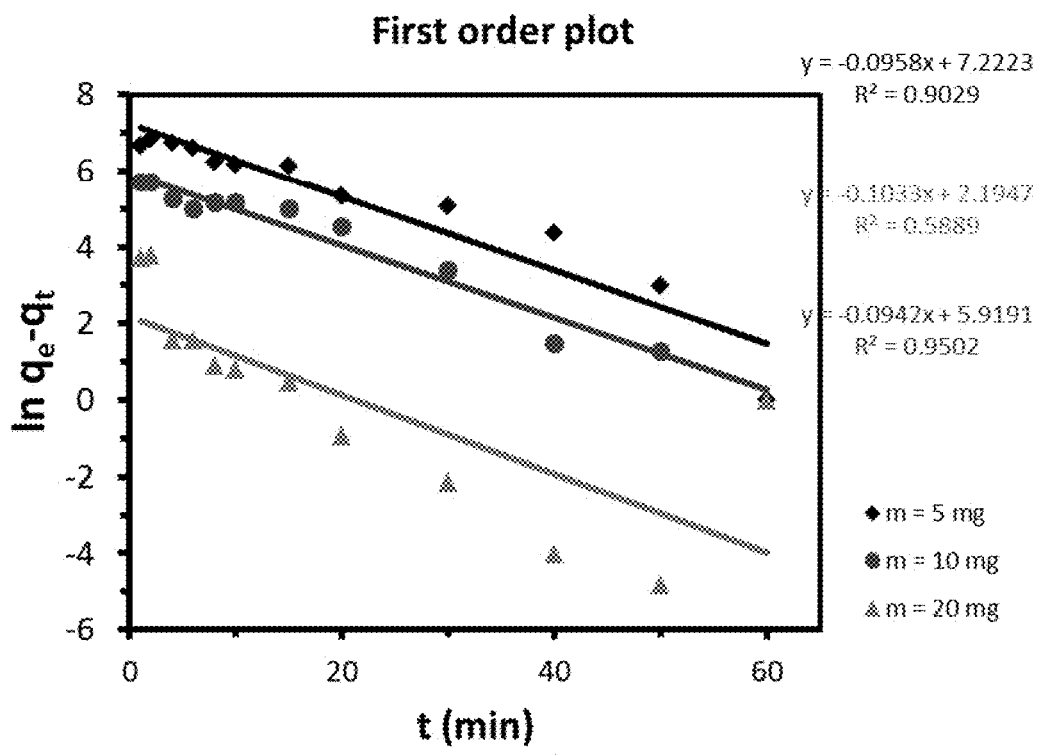
FIG. 7A is a pseudo first order plot illustrating the adsorption kinetics of the composite at 25° C.

Equation for pseudo-first order kinetics is given by the equation:

$$\ln(q_e - q_t) = \ln q_e - k_1 t \qquad (4)$$

where $q_t$ and $q_e$ stand for the amounts of MR (mg) adsorbed at a time t per gram of the material and at equilibrium, respectively, while $k_1$ represents the rate constant as seen in FIG. 7A. The values of $k_1$ and adsorption density $q_e$, were obtained from the plots of $\ln(q_e - q_t)$ versus t, are summarized in Table 1. Disagreement between the experimental ($q_{e, exp}$) and calculated value ($q_{e, cal}$), and the poor correlation coefficients ($R^2$) indicates that the adsorption process does not obey the pseudo-first model.

Pseudo-Second-Order Kinetics

The following second adsorption kinetic rate equation is used to express the pseudo-second-order kinetic model:

$$\frac{dq_t}{dt} = k_2 (q_e - q_t)^2 \qquad (5)$$

where $k_2$ represents the rate constant, $q_e$ and $q_t$ are the adsorption capacity of MR at equilibrium and at time t.

Figure 7B:
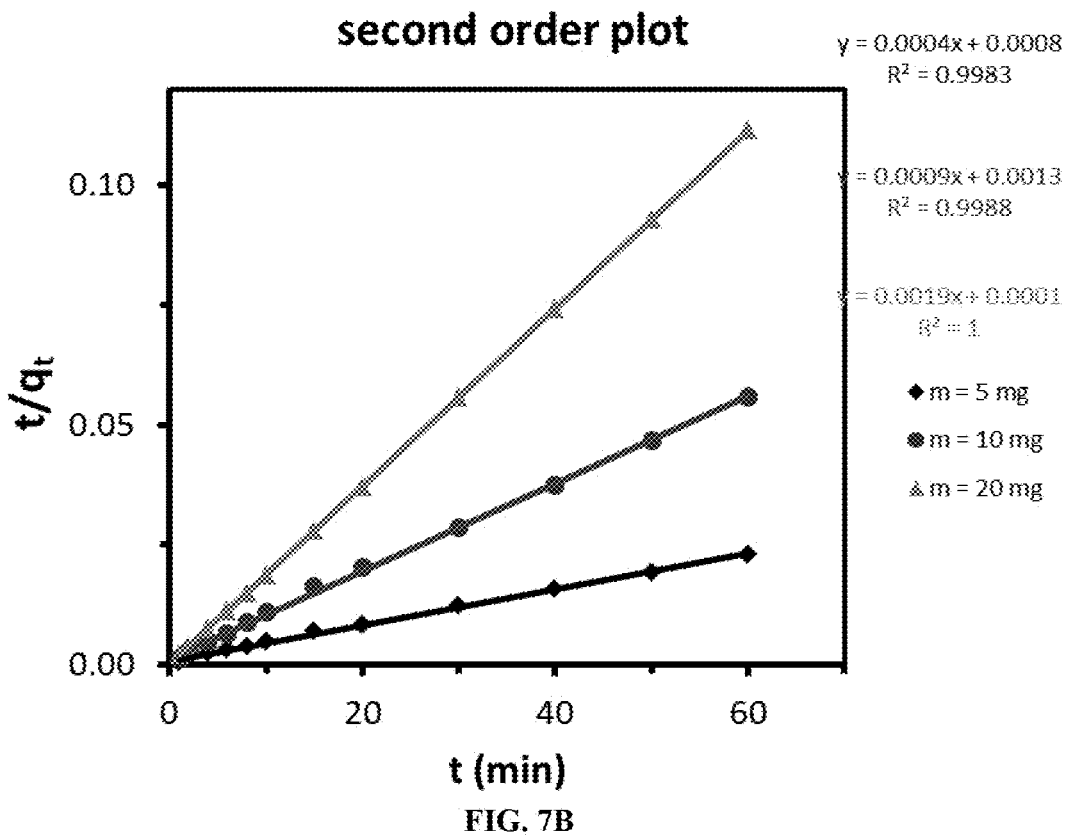
FIG. 7B is a pseudo second order plot illustrating the adsorption kinetics of the composite at 25° C.

In the linear form, the pseudo-second-order can be written as follows:

$$\frac{t}{q_t} = \frac{1}{k_2 q_e^2} + \frac{t}{q_e} \qquad (6)$$

where $k_2$ is obtained by a plot of $t/q_t$ against t (FIG. 7B). The kinetic parameters are listed in Table 1. The values of the correlation coefficients ($R^2 > 0.99$) as well as the close agreement between the equilibrium adsorption capacities ($q_{e, cal}$) with the experimentally observed data ($q_{e, exp}$) indicate that the adsorption process goes in line with the pseudo-second-order kinetic model and the MR are adsorbed on the material via chemical interaction.

Example 12

Isotherms of the Adsorption

Isotherms provide fundamental physiochemical data to evaluate sorption capacity. Three isotherms were employed to analyze the experimental results.

Langmuir Isotherm Model

Figure 8A:
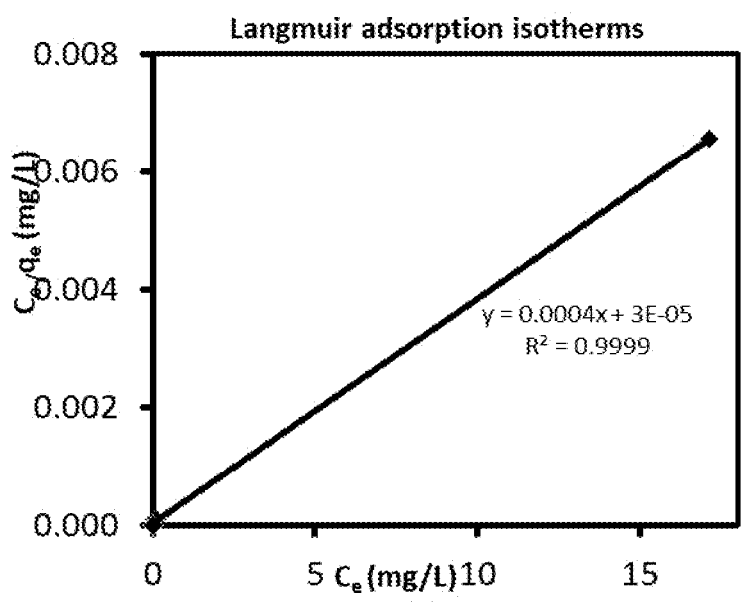
FIG. 8A depicts a Langmuir adsorption isotherm for methyl red adsorption by the composite.

Langmuir model is based on the concept of formation of a single (monolayer) surface phase (a monomolecular adsorption) on energetically homogeneous surfaces of the adsorbent. The model describes a physical or chemical adsorption on solid surfaces. This is called ideal localized monolayer model. The linear Langmuir equation is given by:

$$\frac{C_e}{q_e} = \frac{1}{k_L q_m} + \frac{C_e}{q_m} \qquad (8)$$

where $k_L$ is Langmuir equilibrium constant (L/mg) related to the affinity of adsorption sites, and $q_m$ (mg/g) is the maximum theoretical monolayer adsorption capacity, $C_e$ is the equilibrium concentration (mg/L) of MR in solution and $q_e$ is the amount of MR adsorbed (mg/g) at equilibrium. FIG. 8A depicts the plot of $C_e/q_e$ versus $C_e$.

The values of Langmuir constants $q_m$ and $k_L$ which were computed from the slope and intercept of the plot are given in Table 2. The $q_m$ and $k_L$ were determined to be mg/g of MR and L/mg, respectively. The $R^2$ value indicated that the data fitted well with the Langmuir Isotherm model.

The characteristic parameter of the Langmuir isotherm is illustrated in terms of dimensionless equilibrium parameter $R_L$, also known as separation factor:

$$R_L = \frac{1}{1 + K_L C_o} \qquad (9)$$

where $C_o$ is the initial solute concentration. The value $R_L$ gives an indication of whether the adsorption is unfavourable ($R_L > 1$), linear ($R_L = 1$), favourable ($0 < R_L < 1$) or irreversible ($R_L = 0$). From the data calculated and presented in Table 2, the $R_L$ of 0.0002 indicated the favourable nature of the adsorption.

TABLE 1

Kinetic constant parameters obtained for dye adsorption

| | | pseudo-first order | | | Pseudo-second order | | |
|---|---|---|---|---|---|---|---|
| Dosage (mg) | $q_e$, exp (mg/g) | $k_1$ (min$^{-1}$) | $q_e$, cal (mg/g) | $R^2$ | $k_2{}^a$ | $q_e$, cal (mg/g) | $R^2$ |
| 5 | 2614.66 | 0.0958 | 1369.6 | 0.9029 | 0.0002 | 2500 | 0.9983 |
| 10 | 1076.80 | 0.0942 | 372.08 | 0.9502 | 0.0006 | 1111.1 | 0.9988 |
| 20 | 538.598 | 0.1033 | 8.9773 | 0.5889 | 0.0361 | 526.32 | 1 |

$^a$(g/mg · min).
$^b$(mg/g · min)

TABLE 2

Langmuir, Freundlich and Temkin isotherms constants for MR adsorption

| Langmuir isotherm | | | | Freundlich isotherm | | | | Temkin isotherm | | |
|---|---|---|---|---|---|---|---|---|---|---|
| $q_m$ (mg/g) | $k_L$ (L/mg) | $R_L$ | $R^2$ | 1/n | n | $k_f$ (mg/g) | $R^2$ | $K_T$ (L/g) | $b_T$ (KJ/mol) | $R^2$ |
| 2500 | 13 | 0.0002 | 0.9999 | 0.1623 | 6.16 | 1621 | 0.9985 | 1.009 | 0.012 | 0.9438 |

Freundlich Isotherm Model

The Freundlich model is used to describe the sorption characteristics on heterogeneous surfaces by taking into account the interactions between the adsorbed molecules. The following empirical equation was used:

$$q_e = K_f C_e^{\frac{1}{n}} \tag{10}$$

where $K_F$ (mg/g) is the Freundlich isotherm constant indicating adsorption capacity and n is the adsorption intensity while 1/n is a function of the strength of the adsorption. $C_e$ is the equilibrium concentration of adsorbate (mg/L) and $q_e$ is the amount of adsorbate per adsorbent at equilibrium (mg/g). The logarithmic form of Freundlich is defined as:

$$\ln q_e = \ln K_f + \frac{1}{n} \ln C_e \tag{11}$$

Figure 8B:
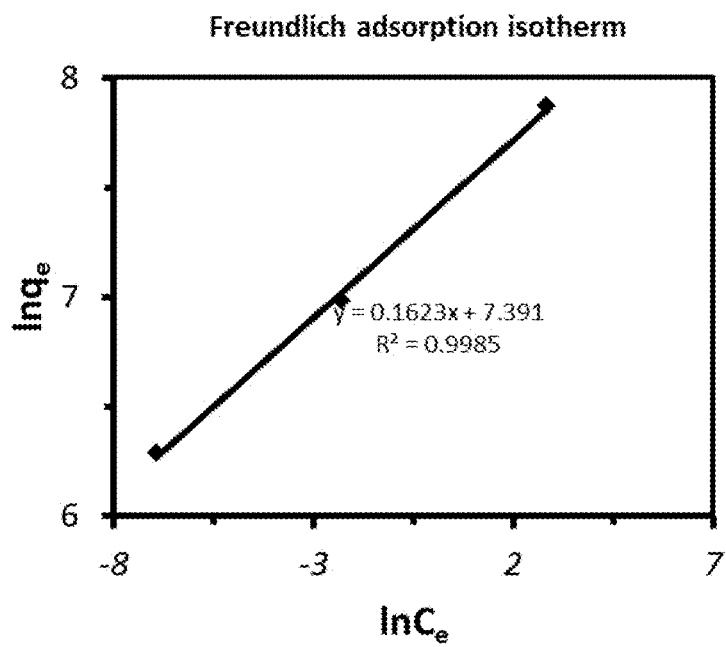
FIG. 8B depicts a Freundlich adsorption isotherm for methyl red adsorption by the composite.

From the plot of ln $q_e$ versus ln $C_e$ (FIG. 8B), $K_F$ and n were calculated and included in Table 2. The n value gives an indication of the favourability of the adsorption process. A value of (1/n)<1 indicates a normal adsorption while (1/n)>1 indicates a cooperative adsorption. In this study, the (1/n) value of 0.1632 indicated a favourable adsorption process of MR on the adsorbent.

Temkin Isotherm

Figure 8C:
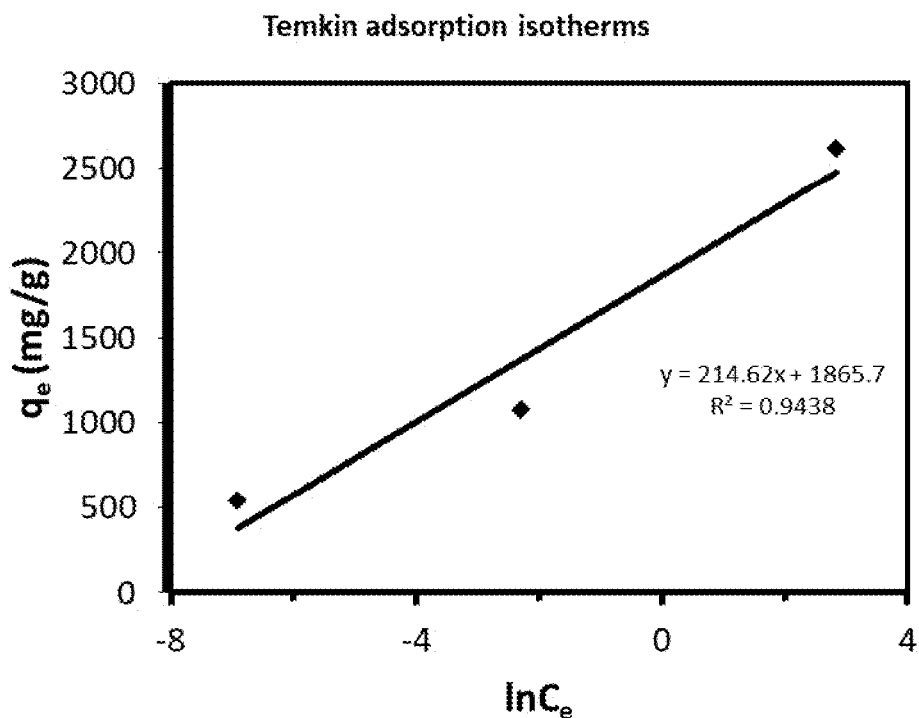
FIG. 8C depicts a Temkin adsorption isotherm for methyl red adsorption by the composite.

The Temkin model takes into account the adsorbent-adsorbate interactions and assumes a linear decrease in the energy of adsorption with surface coverage. The Temkin isotherm model is expressed by:

$$q_e = \frac{RT}{b_T} \ln K_T + \frac{RT}{b_T} \ln C_e \tag{12}$$

where $b_T$ is the Temkin isotherm constant related to the heat of sorption (joule per mole), $k_T$ is the Temkin isotherm equilibrium binding constant (L/g) which is equal to the maximum binding energy (L/g), R is the gas constant (8.314×10$^{-3}$ KJ/mol·K), and T is the absolute temperature (K). The isotherm constants were determined from the plot of $q_e$ versus ln $C_e$ as illustrated in FIG. 8C. The linear plot for the Temkin adsorption isotherm fits quite well with $R^2$ of 0.9438.

Example 13

Thermodynamic Studies

Figure 9:
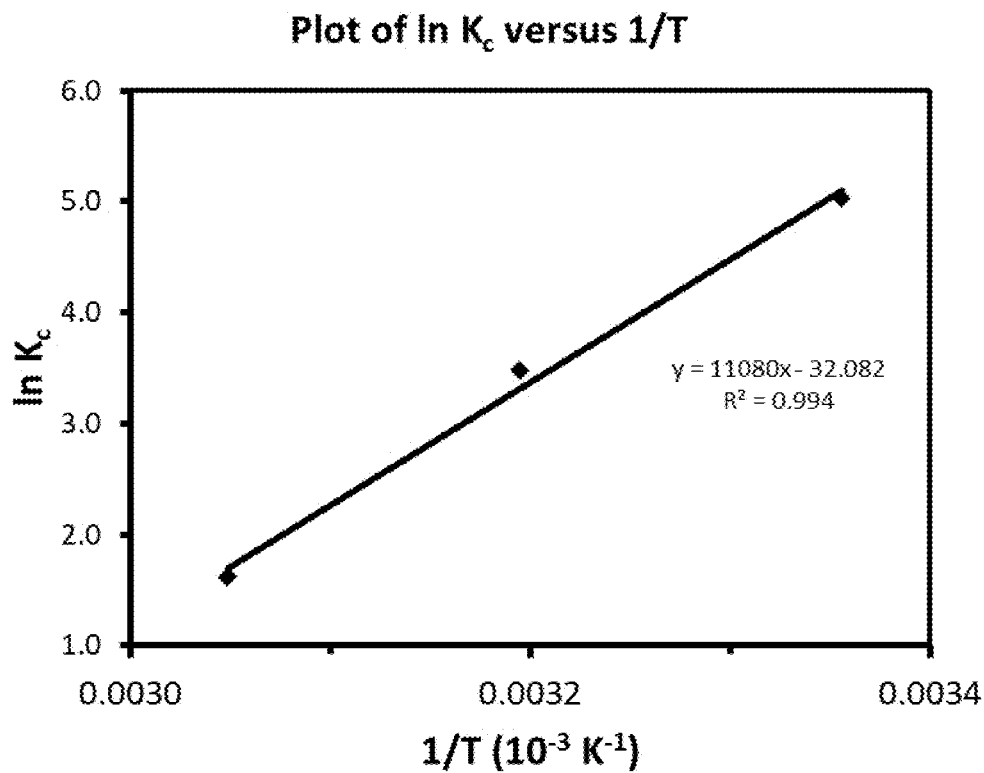
FIG. 9 is a Van't-Hoff plot for calculating thermodynamic parameters of methyl red adsorption by the composite.
Figure 10:
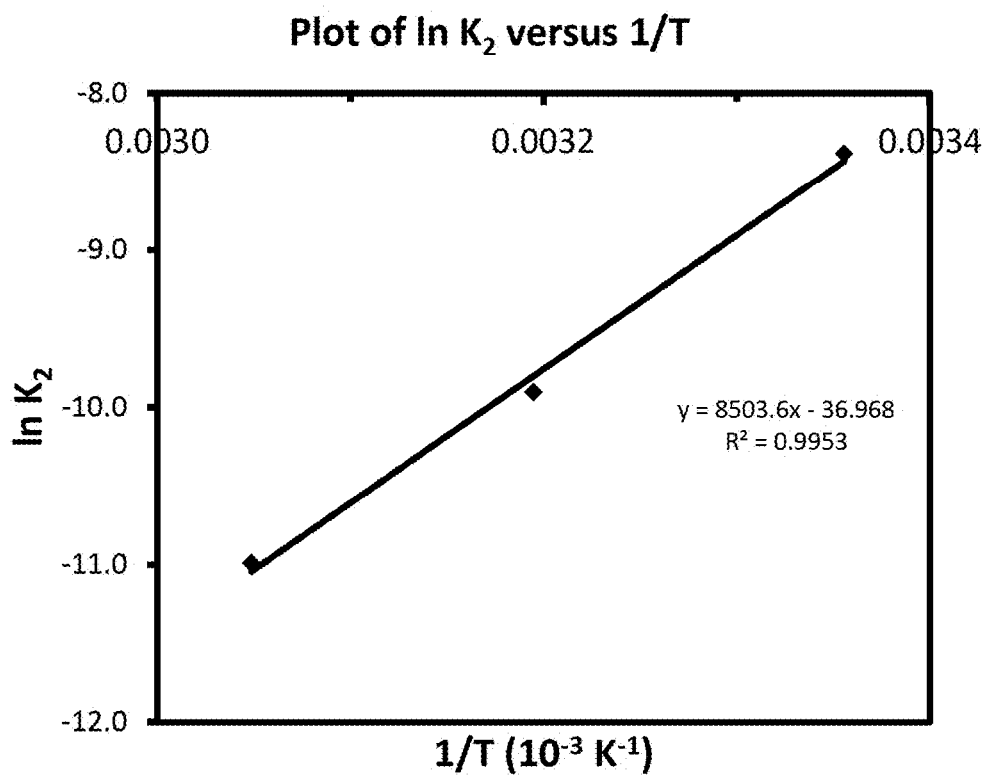
FIG. 10 is an Arrhenius plot for calculating thermodynamic parameters of methyl red adsorption by the composite.

The thermodynamic parameters ΔG° (standard free energy), ΔH° (enthalpy change) and ΔS° (entropy change) were calculated to determine the nature of the adsorption. The experimental data obtained at different temperatures were used to calculate the thermodynamic parameters by plotting $\ln K_c$ versus 1/T (FIG. 9) using the linear Van't Hoff equation:

$$\ln K_c = \frac{\Delta S^0}{R} - \frac{\Delta H^0}{RT} \tag{13}$$

The ΔG° (free energy change) was calculated be the following equation:

$$\Delta G° = \Delta H° - T\Delta S° \tag{14}$$

where R is the gas constant (8.314 J/mol·K), T is the absolute temperature in K, and standard thermodynamic equilibrium constant $K_c = q_e/C_e$ (L/mg). The decrease in ΔG° value with increasing temperature indicated that the adsorption of the ions on the adsorbent becomes favorable at a higher temperature (Table 3). The negative standard enthalpy change ΔH° of kJ/mol, indicated that the adsorption of MR on the adsorbent was exothermic and supported by the increasing adsorption of MR with the decrease in temperature. The negative standard entropy change of J/mol·K reflects the affinity of the adsorbent towards MR.

TABLE 3

Thermodynamic parameters for the adsorption of dye at different temperatures

| T(K) | ΔG° (kJ/mol) | ΔH° (kJ/mol) | ΔS° (J/mol · K) |
|---|---|---|---|
| 298 | −12.634 | | |
| 313 | −8.633 | −92.119 | −0.267 |
| 328 | −4.632 | | |

Example 14

Column Design

Figure 11A:
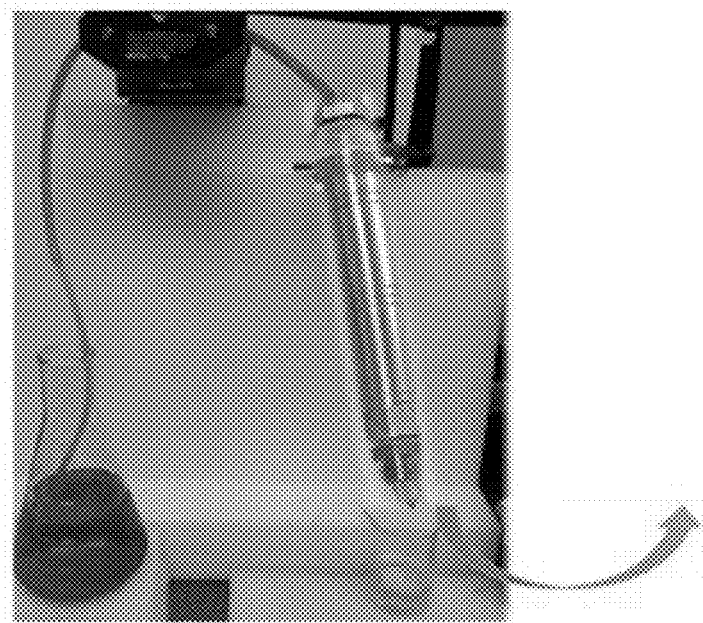
FIG. 11A is a picture showing a filtration system having a column loaded with the composite.
Figure 11B:
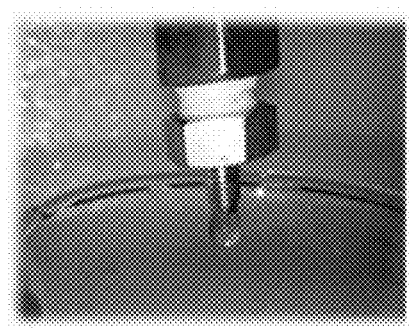
FIG. 11B is a magnified view of the tip of an outlet of the filtration system of FIG. 11A.
Figure 11C:
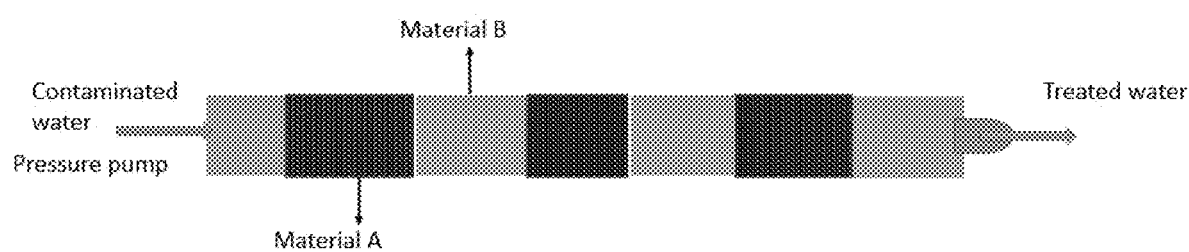
FIG. 11C is a schematic illustration of a packed-bed column system, wherein materials A and B denote magnetic carbon and the composite, respectively.

A glass column with a length of 20 cm and an internal diameter of 0.4 cm filled with the magnetic activated carbon modified by the amine as a fixed bed adsorber was used for the column experiment. FIGS. 11A-C show the experiment setup. The bed was closed by cotton. At the beginning of the experiment, a concentration of 10$^{-4}$ M of methyl red was used, however, the breakthrough point did not show even after 8 hours. Then, a 0.001 M of methyl red solution was pumped into the column at a constant flow rate of 1 mL·min$^{-1}$. The experiment was carried out at room temperature. The column runs were carried out until a breakthrough was achieved. Samples of the effluent were collected at different time intervals and analyzed under UV-Vis.

A graph of concentration at a specific time divided by the initial concentration versus time was plotted. As shown in FIGS. 12A-B, the breakthrough point was observed after 150 min.

Example 15

Removal of Toxic Metals

Using the designed system, the absorbent material showed excellent efficiency for the removal of real wastewater samples containing multiple toxic metals including Cd, Pb, Cu, Cr, Co, Ni, and As. More than 99% removal was achieved using the column system.

Example 16

Environment cleaning and water purification are considered an important social and economic issue. There are adsorbents available for the removal of pollutants from wastewater. However, absorbent materials used in packed columns are required to carry multiple properties, namely removal efficiency, mechanical stability, mass transfer and dynamic flow, as well as cost-effectiveness to perform the task. Thus, it is challenging to design and prepare absorbent materials to be used in column modes to for environmental water purification.

The synthesis of PEI-modified magnetic activated carbon from a relatively inexpensive source is disclosed herein. This synthesis approach ensured the preservation of the integrity of all three original functionalities of the three components. The material was characterized using BET, FTIR, SEM, and EDX. A good adsorption performance with high adsorption capacity and long breakthrough was observed when applying the material as a resin in the adsorption of methyl red from an aqueous medium

The invention claimed is:

1. A batch method for treating wastewater, comprising:
    crushing a composite to form composite particles having an average particle size of 50-200 μm,
    contacting an aqueous solution having an initial concentration of a pollutant with the composite particles to form a mixture; and
    filtering the mixture to obtain a pollutant loaded composite and an aqueous solution having a reduced concentration of the pollutant compared to the initial concentration,
    wherein the composite comprises:
        a magnetic core comprising $Fe_3O_4$ disposed on activated carbon; and
        a branched polyethylenimine,
        wherein the $Fe_3O_4$ is in the form of nanoparticles having an average particle size of 1-100 nm; and
        wherein the magnetic core comprises activated carbonyl groups on a surface of the magnetic core.

2. The method of claim 1, wherein the activated carbonyl groups are acyl halide groups.

3. The method of claim 1, wherein the branched polyethylenimine is bonded to the surface of the magnetic core via an amide linkage.

4. The method of claim 1, wherein the branched polyethylenimine has a number average molecular weight in a range of 200-80,000 Da.

5. The method of claim 1, wherein a weight ratio of the $Fe_3O_4$ nanoparticles to the activated carbon is in a range of 2:3 to 3:1.

6. The method of claim 1, wherein the composite particles have a surface area of 140-180 $m^2/g$.

7. The method of claim 1, wherein the composite particles have a pore volume of 0.2-0.28 $cm^3/g$, and a pore size of 4-8 nm.

8. The method of claim 1, wherein the pollutant is an organic dye, a heavy metal, or both.

9. The method of claim 8, wherein the pollutant is an organic dye, and wherein the organic dye is methyl red.

10. The method of claim 8, wherein the pollutant is a heavy metal, and wherein the heavy metal is an ion of at least one heavy metal selected from the group consisting of Cd, Pb, Cu, Cr, Ni, and As.

11. The method of claim 1, wherein the composite is present in a concentration in a range of 0.01-20 g per liter of the aqueous solution during the contacting, and wherein greater than 70% of a total mass of the pollutant is removed from the aqueous solution.

* * * * *